United States Patent [19]
Garg et al.

[11] Patent Number: 5,493,687
[45] Date of Patent: Feb. 20, 1996

[54] RISC MICROPROCESSOR ARCHITECTURE IMPLEMENTING MULTIPLE TYPED REGISTER SETS

[75] Inventors: Sanjiv Garg, Fremont; Derek J. Lentz, Los Gatos; Le T. Nguyen, Monte Sereno; Sho L. Chen, Saratoga, all of Calif.

[73] Assignee: Seiko Epson Corporation, Tokyo, Japan

[21] Appl. No.: 726,773

[22] Filed: Jul. 8, 1991

[51] Int. Cl.$^6$ ........................................................ G06F 9/34
[52] U.S. Cl. ................... 395/800; 395/375; 364/232.23; 364/245.1; 364/247; 364/DIG. 1; 364/258; 364/259.1
[58] Field of Search ................................. 395/800, 375, 395/425

[56] References Cited

U.S. PATENT DOCUMENTS

| | | | |
|---|---|---|---|
| 4,212,076 | 7/1980 | Conners | 364/706 |
| 5,125,092 | 6/1992 | Prener | 395/725 |
| 5,201,056 | 4/1993 | Daniel et al. | 395/800 |
| 5,241,636 | 8/1993 | Kohn | 395/375 |

FOREIGN PATENT DOCUMENTS

| | | |
|---|---|---|
| 0170284 | 2/1986 | European Pat. Off. . |
| 0213843 | 3/1987 | European Pat. Off. . |
| 0241909 | 10/1987 | European Pat. Off. . |
| 0454636 | 10/1991 | European Pat. Off. . |
| 2190521 | 11/1987 | United Kingdom . |

OTHER PUBLICATIONS

Ruby B. Lee, "Precision Architecture," *IEEE Computer*, pp. 78–91, Jan. 1989.
Daryl Odnert et al., "Architecture and Computer Enhancements for PA–RISC Workstations," *Proc. from IEEE Compcon*, San Francisco, CA, pp. 214–218, Feb. 1991.
Maejima et al., "A 16-bit Microprocessor with Multi–Register Bank Architecture", Proc. Fall Joint Computer Conference, Nov. 2–6, 1986, pp. 1014–1019.
Groves et al., "An IBM Second Generation RISC Processor Architecture", 35th IEEE Computer Society International Conference, Feb. 26, 1990, pp. 166–172.
Miller et al., "Exploiting Large Register Sets", Microprocessors and Microsystems, vol. 14, No. 6, Jul. 1990, pp. 333–340.
Adams et al., "Utilising Low Level Parallelism in General Purpose Code: The HARP Project", Microprocessing and Microprogramming, vol. 29, No. 3, Oct. 1990, pp. 137–149.
Molnar et al. "Floating–Point Processor" 1989 IEEE.
Stevens et al; "HARP: A Parallel Pipelined RISC Processor"; Nov. 1989.
Birman et al; "Design of a High–Speed Arithmetic Datapath"; 1988.
Paterson et al. "A VLSI RISC" *Computer* Sep. 1982.

*Primary Examiner*—Alyssa H. Bowler
*Assistant Examiner*—L. Donaghue
*Attorney, Agent, or Firm*—Sterne, Kessler, Goldstein & Fox

[57] ABSTRACT

A register system for a data processor which operates in a plurality of modes. The register system provides multiple, identical banks of register sets, the data processor controlling access such that instructions and processes need not specify any given bank. An integer register set includes first (RA[23:0]) and second (RA[31:24]) subsets, and a shadow subset (RT[31:24]). While the data processor is in a first mode, instructions access the first and second subsets. While the data processor is in a second mode, instructions may access the first subset, but any attempts to access the second subset are re-routed to the shadow subset instead, transparently to the instructions, allowing system routines to seemingly use the second subset without having to save and restore data which user routines have written to the second subset. A re-typable register set provides integer width data and floating point width data in response to integer instructions and floating point instructions, respectively. Boolean comparison instructions specify particular integer or floating point registers for source data to be compared, and specify a particular Boolean register for the result, so there are no dedicated, fixed-location status flags. Boolean combinational instructions combine specified Boolean registers, for performing complex Boolean comparisons without intervening conditional branch instructions, to minimize pipeline disruption.

5 Claims, 9 Drawing Sheets

FIG.−1

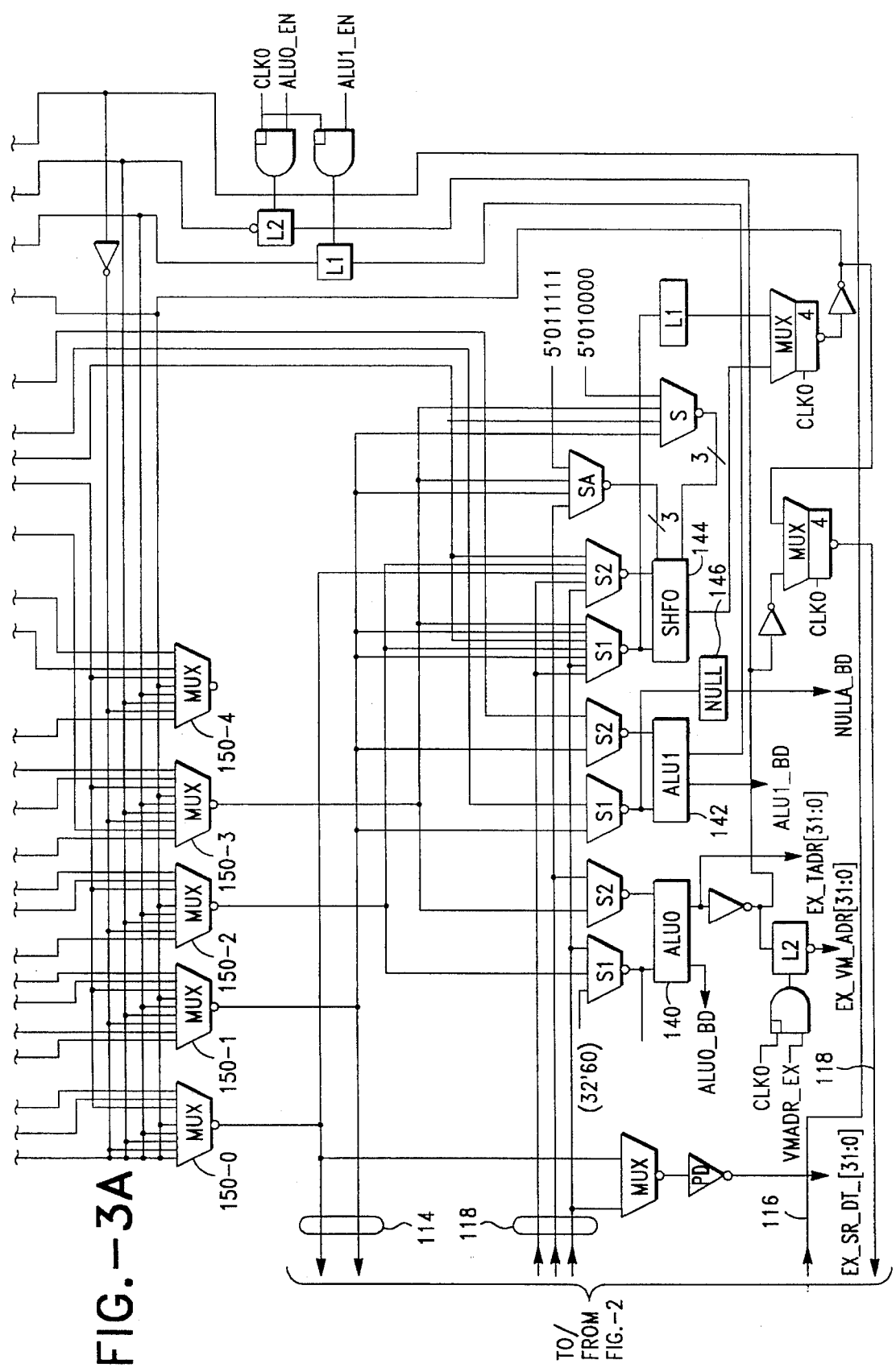

RISC MICROPROCESSOR ARCHITECTURE IMPLEMENTING MULTIPLE TYPED REGISTER SETS

CROSS-REFERENCE TO RELATED APPLICATIONS

Applications of particular interest to the present application, include:

1. HIGH-PERFORMANCE RISC MICROPROCESSOR ARCHITECTURE, SC/Ser. No. 07/817,810, filed Jan. 8, 1992, which is a continuation of Ser. No. 07/727,066, filed Jul. 8, 1991, by Le Nguyen, et al.;

2. EXTENSIBLE RISC MICROPROCESSOR ARCHITECTURE, SC/Ser. No. 07/817,809, filed Jan. 8, 1992, which is a continuation of Ser. No. 07/727,058, filed Jul. 8, 1991, by Quang Trang, et al.

3. RISC MICROPROCESSOR ARCHITECTURE WITH ISOLATED ARCHITECTURAL DEPENDENCIES, SC/Ser. No. 07/817,807, filed Jan. 8, 1992, which is a continuation of Ser. No. 07/726,744, filed Jul. 8, 1991, by Yoshi Miyayama;

4. RISC MICROPROCESSOR ARCHITECTURE IMPLEMENTING FAST TRAP AND EXCEPTION STATE, Ser. No. 08/345,333 which is now U.S. Pat. No. 5,481,685, filed Nov. 21, 1994, which is a continuation of Ser. No. 07/171,968, filed Dec. 23, 1993, which is a continuation of Ser. No. 07/817,811, filed Jan. 8, 1992, which is a continuation of Ser. No. 07/726,942, filed Jul. 8, 1991 by Quang Trang;

5. SINGLE CHIP PAGE PRINTER CONTROLLER, SC/Ser. No. 07/817,813, filed Jan. 8, 1992, which is a continuation of Ser. No. 07/726,929, filed Jul. 8, 1991 by Derek Lentz; and 6. MICROPROCESSOR ARCHITECTURE CAPABLE OF SUPPORTING MULTIPLE HETEROGENEOUS PROCESSORS, SC/Ser. No. 07/726,893, filed Jul. 8, 1991, by Derek Lentz.

The above-identified Applications are hereby incorporated herein by reference, their collective teachings being part of the present disclosure.

BACKGROUND OF THE INVENTION

1. Field of the Invention

The present invention relates generally to microprocessors, and more specifically to a RISC microprocessor having plural, symmetrical sets of registers.

2. Description of the Background

In addition to the usual complement of main memory storage and secondary permanent storage, a microprocessor-based computer system typically also includes one or more general purpose data registers, one or more address registers, and one or more status flags. Previous systems have included integer registers for holding integer data and floating point registers for holding floating point data. Typically, the status flags are used for indicating certain conditions resulting from the most recently executed operation. There generally are status flags for indicating whether, in the previous operation: a carry occurred, a negative number resulted, and/or a zero resulted.

These flags prove useful in determining the outcome of conditional branching within the flow of program control. For example, if it is desired to compare a first number to a second number and upon the conditions that the two are equal, to branch to a given subroutine, the microprocessor may compare the two numbers by subtracting one from the other, and setting or clearing the appropriate condition flags. The numerical value of the result of the subtraction need not be stored. A conditional branch instruction may then be executed, conditioned upon the status of the zero flag. While being simple to implement, this scheme lacks flexibility and power. Once the comparison has been performed, no further numerical or other operations may be performed before the conditional branch upon the appropriate flag; otherwise, the intervening instructions will overwrite the condition flag values resulting from the comparison, likely causing erroneous branching. The scheme is further complicated by the fact that it may be desirable to form greatly complex tests for branching, rather than the simple equality example given above.

For example, assume that the program should branch to the subroutine only upon the condition that a first number is greater than a second number, and a third number is less than a fourth number, and a fifth number is equal to a sixth number. It would be necessary for previous microprocessors to perform a lengthy series of comparisons heavily interspersed with conditional branches. A particularly undesirable feature of this serial scheme of comparing and branching is observed in any microprocessor having an instruction pipeline.

In a pipelined microprocessor, more than one instruction is being executed at any given time, with the plural instructions being in different stages of execution at any given moment. This provides for vastly improved throughput. A typical pipeline microprocessor may include pipeline stages for: (a) fetching an instruction, (b) decoding the instruction, (c) obtaining the instruction's operands, (d) executing the instruction, and (e) storing the results. The problem arises when a conditional branch instruction is fetched. It may be the case that the conditional branch's condition cannot yet be tested, as the operands may not yet be calculated, if they are to result from operations which are yet in the pipeline. This results in a "pipeline stall" which dramatically slows down the processor.

Another shortcoming of previous microprocessor-based systems is that they have included only a single set of registers of any given data type. In previous architectures, when an increased number of registers has been desired within a given data type, the solution has been simply to increase the size of the single set of those type of registers. This may result in addressing problems, access conflict problems, and symmetry problems.

On a similar note, previous architectures have restricted each given register set to one respective numerical data type. Various prior systems have allowed general purpose registers to hold either numerical data or address "data", but the present application will not use the term "data" to include addresses. What is intended may be best understood with reference to two prior systems. The Intel 8085 microprocessor includes a register pair "HL" which can be used to hold either two bytes of numerical data or one two-byte address. The present application's improvement is not directed to that issue. More on point, the Intel 80486 microprocessor includes a set of general purpose integer data registers and a set of floating point registers, with each set being limited to its respective data type, at least for purposes of direct register usage by arithmetic and logic units.

This proves wasteful of the microprocessor's resources, such as the available silicon area, when the microprocessor is performing operations which do not involve both data types. For example, user applications frequently involve exclusively integer operations, and perform no floating point operations whatsoever. When such a user application is run on a previous microprocessor which includes floating point registers (such as the 80486), those floating point registers remain idle during the entire execution.

Another problem with previous microprocessor register set architecture is observed in context switching or state switching between a user application and a higher access privilege level entity such as the operating system kernel. When control within the microprocessor switches context, mode, or state, the operating system kernel or other entity to which control is passed typically does not operate on the same data which the user application has been operating on. Thus, the data registers typically hold data values which are not useful to the new control entity but which must be maintained until the user application is resumed. The kernel must generally have registers for its own use, but typically has no way of knowing which registers are presently in use by the user application. In order to make space for its own data, the kernel must swap out or otherwise store the contents of a predetermined subset of the registers. This results in considerable loss of processing time to overhead, especially if the kernel makes repeated, short-duration assertions of control.

On a related note, in prior microprocessors, when it is required that a "grand scale" context switch be made, it has been necessary for the microprocessor to expend even greater amounts of processing resources, including a generally large number of processing cycles, to save all data and state information before making the switch. When context is switched back, the same performance penalty has previously been paid, to restore the system to its former state. For example, if a microprocessor is executing two user applications, each of which requires the full complement of registers of each data type, and each of which may be in various stages of condition code setting operations or numerical calculations, each switch from one user application to the other necessarily involves swapping or otherwise saving the contents of every data register and state flag in the system. This obviously involves a great deal of operational overhead, resulting in significant performance degradation, particularly if the main or the secondary storage to which the registers must be saved is significantly slower than the microprocessor itself.

Therefore, we have discovered that it is desirable to have an improved microprocessor architecture which allows the various component conditions of a complex condition to be calculated without any intervening conditional branches. We have further discovered that it is desirable that the plural simple conditions be calculable in parallel, to improve throughput of the microprocessor.

We have also discovered that it is desirable to have an architecture which allows multiple register sets within a given data type.

Additionally, we have discovered it to be desirable for a microprocessor's floating point registers to be usable as integer registers, in case the available integer registers are inadequate to optimally to hold the necessary amount of integer data. Notably, we have discovered that it is desirable that such re-typing be completely transparent to the user application.

We have discovered it to be highly desirable to have a microprocessor which provides a dedicated subset of registers which are reserved for use by the kernel in lieu of at least a subset of the user registers, and that this new set of registers should be addressable in exactly the same manner as the register subset which they replace, in order that the kernel may use the same register addressing scheme as user applications. We have further observed that it is desirable that the switch between the two subsets of registers require no microprocessor overhead cycles, in order to maximally utilize the microprocessor's resources.

Also, we have discovered it to be desirable to have a microprocessor architecture which allows for a "grand scale" context switch to be performed with minimal overhead. In this vein, we have discovered that is desirable to have an architecture which allows for plural banks of register sets of each type, such that two or more user applications may be operating in a multi-tasking environment, or other "simultaneous" mode, with each user application having sole access to at least a full bank of registers. It is our discovery that the register addressing scheme should, desirably, not differ between user applications, nor between register banks, to maximize simplicity of the user applications, and that the system should provide hardware support for switching between the register banks so that the user applications need not be aware of which register bank which they are presently using or even of the existence of other register banks or of other user applications.

These and other advantages of our invention will be appreciated with reference to the following description of our invention, the accompanying drawings, and the claims.

SUMMARY OF THE INVENTION

The present invention provides a register file system comprising: an integer register set including first and second subsets of integer registers, and a shadow subset; a re-typable set of registers which are individually usable as integer registers or as floating point registers; and a set of individually addressable Boolean registers.

The present invention includes integer and floating point functional units which execute integer instructions accessing the integer register set, and which operate in a plurality of modes. In any mode, instructions are granted ordinary access to the first subset of integer registers. In a first mode, instructions are also granted ordinary access to the second subset. However, in a second mode, instructions attempting to access the second subset are instead granted access to the shadow subset, in a manner which is transparent to the instructions. Thus, routines may be written without regard to which mode they will operate in, and system routines (which operate in the second mode) can have at least the second subset seemingly at their disposal, without having to expend the otherwise-required overhead of saving the second subset's contents (which may be in use by user processes operating in the first mode).

The invention further includes a plurality of integer register sets, which are individually addressable as specified by fields in instructions. The register sets include read ports and write ports which are accessed by multiplexers, wherein the multiplexers are controlled by contents of the register set-specifying fields in the instructions.

One of the integer register sets is also usable as a floating point register set. In one embodiment, this set is sixty-four bits wide to hold double-precision floating point data, but only the low order thirty-two bits are used by integer instructions.

The invention includes functional units for performing Boolean operations, and further includes a Boolean register set for holding results of the Boolean operations such that no dedicated, fixed-location status flags are required. The integer and floating point functional units execute numerical comparison instructions, which specify individual ones of the Boolean registers to hold results of the comparisons. A Boolean functional unit executes Boolean combinational instructions whose sources and destination are specified registers in the Boolean register set. Thus, the present invention may perform conditional branches upon a single result of a complex Boolean function without intervening conditional branch instructions between the fundamental parts of the complex Boolean function, minimizing pipeline disruption in the data processor.

Finally, there are multiple, identical register banks in the system, each bank including the above-described register sets. A bank may be allocated to a given process or routine, such that the instructions within the routine need not specify upon which bank they operate.

DETAILED DESCRIPTION OF THE PREFERRED EMBODIMENTS

I. REGISTER FILE

Figure 1:
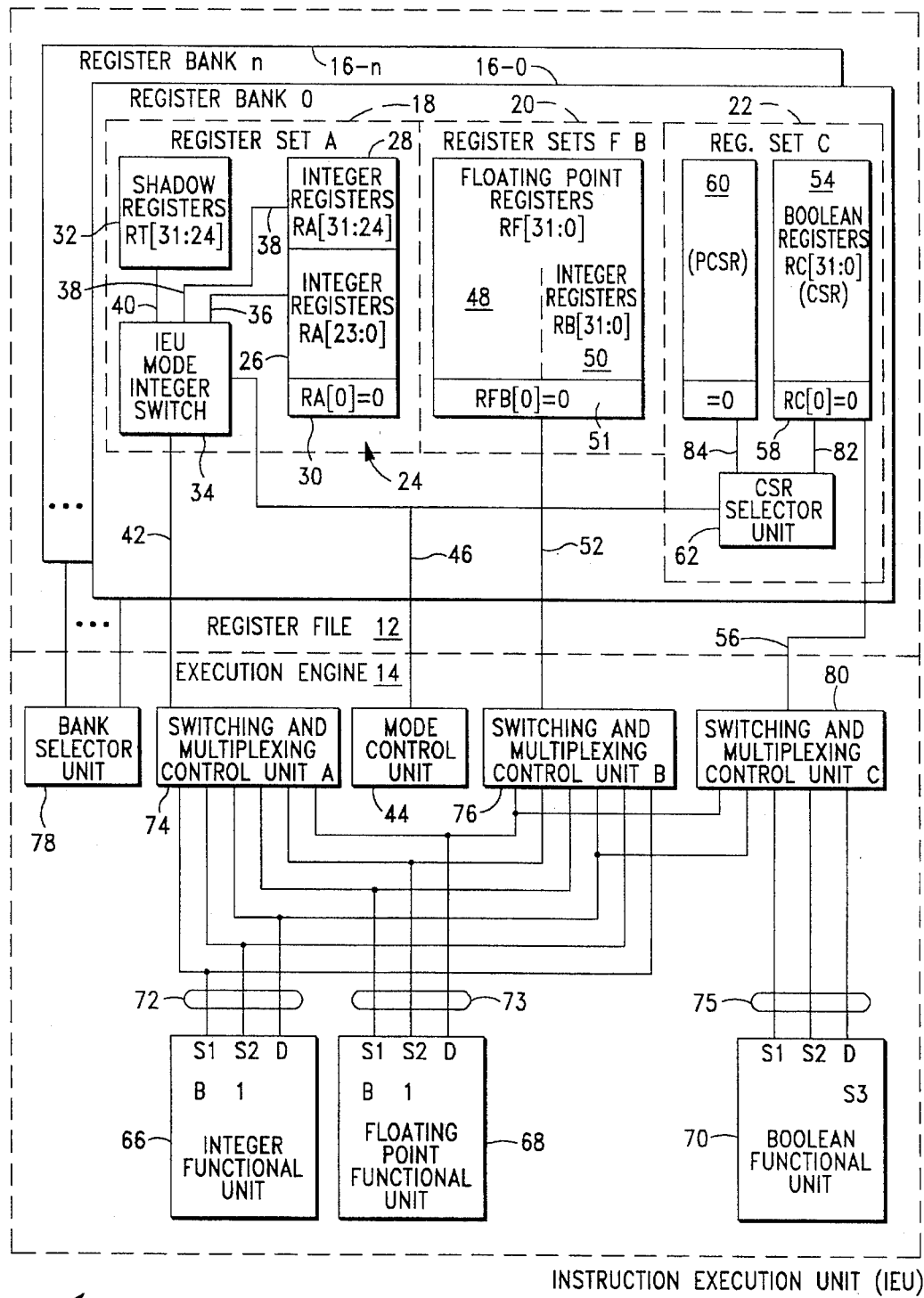
FIG. 1 is a block diagram of the instruction execution unit of the microprocessor of the present invention, showing the elements of the register file.

FIG. 1 illustrates the basic components of the instruction execution unit (IEU) 10 of the RISC (reduced instruction set computing) processor of the present invention. The IEU 10 includes a register file 12 and an execution engine 14. The register file 12 includes one or more register banks 16-0 to 16-n. It will be understood that the structure of each register bank 16 is identical to all of the other register banks 16. Therefore, the present application will describe only register bank 16-0. The register bank includes a register set A 18, a register set FB 20, and a register set C 22.

In general, the invention may be characterized as a RISC microprocessor having a register file optimally configured for use in the execution of RISC instructions, as opposed to conventional register files which are sufficient for use in the execution of CISC (complex instruction set computing) instructions by CISC processors. By having a specially adapted register file, the execution engine of the microprocessor's IEU achieves greatly improved performance, both in terms of resource utilization and in terms of raw throughput. The general concept is to tune a register set to a RISC instruction, while the specific implementation may involve any of the register sets in the architecture.

A. Register Set A

Register set A 18 includes integer registers 24 (RA[31:0]), each of which is adapted to hold an integer value datum. In one embodiment, each integer may be thirty-two bits wide.

The RA[] integer registers 24 include a first plurality 26 of integer registers (RA[23:0]) and a second plurality 28 of integer registers (RA[31:24]). The RA[] integer registers 24 are each of identical structure, and are each addressable in the same manner, albeit with a unique address within the integer register set 24. For example, a first integer register 30 (RA[0]) is addressable at a zero offset within the integer register set 24.

RA[0] always contains the value zero. It has been observed that user applications and other programs use the constant value zero more than any other constant value. It is, therefore, desirable to have a zero readily available at all times, for clearing, comparing, and other purposes. Another advantage of having a constant, hard-wired value in a given register, regardless of the particular value, is that the given register may be used as the destination of any instruction whose results need not be saved.

Also, this means that the fixed register will never be the cause of a data dependency delay. A data dependency exists when a "slave" instruction requires, for one or more of its operands, the result of a "master" instruction. In a pipelined processor, this may cause pipeline stalls. For example, the master instruction, although occurring earlier in the code sequence than the slave instruction, may take considerably longer to execute. It will be readily appreciated that if a slave "increment and store" instruction operates on the result data of a master "quadruple-word integer divide" instruction, the slave instruction will be fetched, decoded, and awaiting execution many clock cycles before the master instruction has finished execution. However, in certain instances, the numerical result of a master instruction is not needed, and the master instruction is executed for some other purpose only, such as to set condition code flags. If the master instruction's destination is RA[0], the numerical results will be effectively discarded. The data dependency checker (not shown) of the IEU 10 will not cause the slave instruction to be delayed, as the ultimate result of the master instruction —zero— is already known.

The integer register set A 24 also includes a set of shadow registers 32 (RT[31:24]). Each shadow register can hold an integer value, and is, in one embodiment, also thirty-two bits wide. Each shadow register is addressable as an offset in the same manner in which each integer register is addressable.

Finally, the register set A includes an IEU mode integer switch 34. The switch 34, like other such elements, need not have a physical embodiment as a switch, so long as the corresponding logical functionality is provided within the register sets. The IEU mode integer switch 34 is coupled to the first subset 26 of integer registers on line 36, to the second subset of integer registers 28 on line 38, and to the shadow registers 32 on line 40. All accesses to the register set A 18 are made through the IEU mode integer switch 34 on line 42. Any access request to read or write a register in the first subset RA[23:0] is passed automatically through the IEU mode integer switch 34. However, accesses to an integer register with an offset outside the first subset RA[23:0] will be directed either to the second subset RA[31:24] or the shadow registers RT[31;24], depending upon the operational mode of the execution engine 14.

The IEU mode integer switch 34 is responsive to a mode control unit 44 in the execution engine 14. The mode control unit 44 provides pertinent state or mode information about the IEU 10 to the IEU mode integer switch 34 on line 46. When the execution engine performs a context switch such as a transfer to kernel mode, the mode control unit 44 controls the IEU mode integer switch 34 such that any requests to the second subset RA[31:24] are re-directed to the shadow RT[31:24], using the same requested offset within the integer set. Any operating system kernel or other then-executing entity may thus have apparent access to the second subset RA[31:24] without the otherwise-required overhead of swapping the contents of the second subset RA[31:24] out to main memory, or pushing the second subset RA[31:24] onto a stack, or other conventional register-saving technique.

When the execution engine 14 returns to normal user mode and control passes to the originally-executing user application, the mode control unit 44 controls the IEU mode integer switch 34 such that access is again directed to the second subset RA[31:24]. In one embodiment, the mode control unit 44 is responsive to the present state of interrupt enablement in the IEU 10. In one embodiment, the execution engine 14 includes a processor status register (PSR) (not shown), which includes a one-bit flag (PSR[7]) indicating whether interrupts are enabled or disabled. Thus, the line 46 may simply couple the IEU mode integer switch 34 to the interrupts-enabled flag in the PSR. While interrupts are disabled, the IEU 10 maintains access to the integers RA[23:0], in order that it may readily perform analysis of various data of the user application. This may allow improved debugging, error reporting, or system performance analysis.

B. Register Set FB

The re-typable register set FB 20 may be thought of as including floating point registers 48 (RF[31:0]), and/or integer registers 50 (RB[31:0]). When neither data type is implied to the exclusion of the other, this application will use the term RFB[]. In one embodiment, the floating point registers RF[] occupy the same physical silicon space as the integer registers RB[]. In one embodiment, the floating point registers RF[] are sixty-four bits wide and the integer registers RB[] are thirty-two bits wide. It will be understood that if double-precision floating point numbers are not required, the register set RFB[] may advantageously be constructed in a thirty-two-bit width to save the silicon area otherwise required by the extra thirty-two bits of each floating point register.

Each individual register in the register set RFB[] may hold either a floating point value or an integer value. The register set RFB[] may include optional hardware for preventing accidental access of a floating point value as though it were an integer value, and vice versa. In one embodiment, however, in the interest of simplifying the register set RFB[], it is simply left to the software designer to ensure that no erroneous usages of individual registers are made. Thus, the execution engine 14 simply makes an access request on line 52, specifying an offset into the register set RFB[], without specifying whether the register at the given offset is intended to be used as a floating point register or an integer register. Within the execution engine 14, various entities may use either the full sixty-four bits provided by the register set RFB[], or may use only the low order thirty-two bits, such as in integer operations or single-precision floating point operations.

A first register RFB[0] 51 contains the constant value zero, in a form such that RB[0] is a thirty-two-bit integer zero (0000$_{hex}$) and RF[0] is a sixty-four-bit floating point zero (00000000$_{hex}$). This provides the same advantages as described above for RA[0].

C. Register Set C

The register set C 22 includes a plurality of Boolean registers 54 (RC[31:0]). RC[] is also known as the "condition status register" (CSR). The Boolean registers RC[] are each identical in structure and addressing, albeit that each is individually addressable at a unique address or offset within RC[].

In one embodiment, register set C further includes a "previous condition status register" (PCSR) 60, and the register set C also includes a CSR selector unit 62, which is responsive to the mode control unit 44 to select alternatively between the CSR 54 and the PCSR 60. In the one embodiment, the CSR is used when interrupts are enabled, and the PCSR is used when interrupts are disabled. The CSR and PCSR are identical in all other respects. In the one embodiment, when interrupts are set to be disabled, the CSR selector unit 62 pushes the contents of the CSR into the PCSR, overwriting the former contents of the PCSR, and when interrupts are re-enabled, the CSR selector unit 62 pops the contents of the PCSR back into the CSR. In other embodiments it may be desirable to merely alternate access between the CSR and the PCSR, as is done with RA[31:24] and RT[31:24]. In any event, the PCSR is always available as a thirty-two-bit "special register".

None of the Boolean registers is a dedicated condition flag, unlike the Boolean registers in previously known microprocessors. That is, the CSR 54 does not include a dedicated carry flag, nor a dedicated a minus flag, nor a dedicated flag indicating equality of a comparison or a zero subtraction result. Rather, any Boolean register may be the destination of the Boolean result of any Boolean operation. As with the other register sets, a first Boolean register 58 (RC[0]) always contains the value zero, to obtain the advantages explained above for RA[0]. In the preferred embodiment, each Boolean register is one bit wide, indicating one Boolean value.

II. EXECUTION ENGINE

The execution engine 14 includes one or more integer functional units 66, one or more floating point functional units 68, and one or more Boolean functional units 70. The functional units execute instructions as will be explained below. Buses 72, 73, and 75 connect the various elements of the IEU 10, and will each be understood to represent data, address, and control paths.

A. Instruction Format

Figure 7:
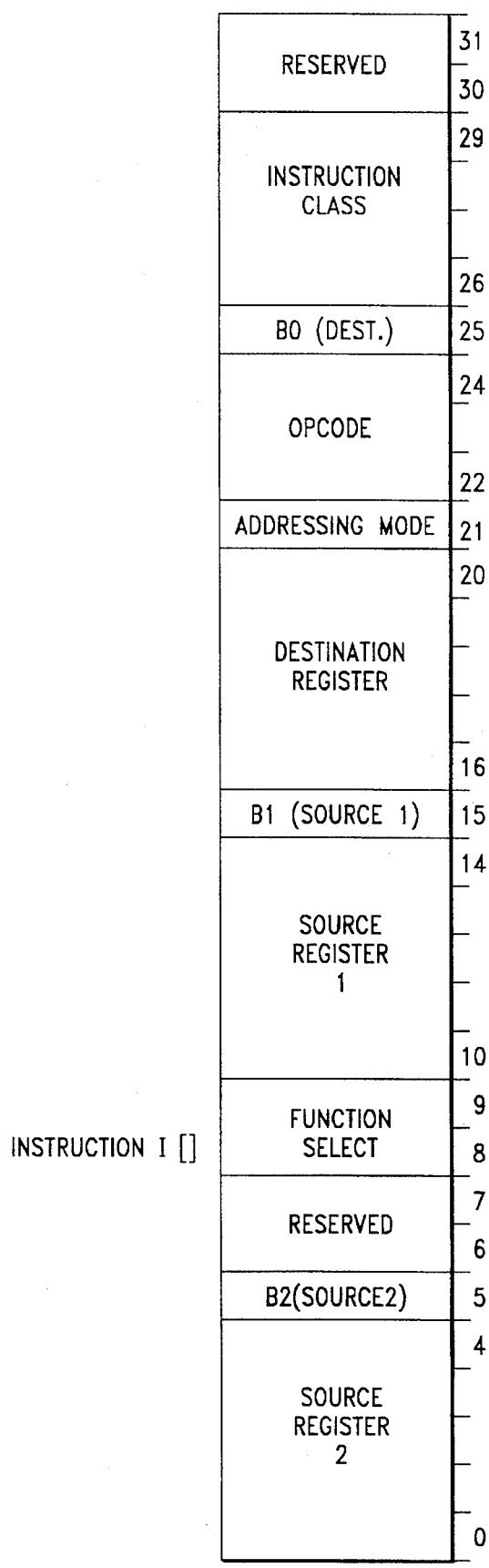
FIG. 7 illustrates the fields of an exemplary microprocessor instruction word executable by the instruction execution unit of FIG. 1.

FIG. 7 illustrates one exemplary format for an integer instruction which the execution engine 14 may execute. It will be understood that not all instructions need to adhere strictly to the illustrated format, and that the data processing system includes an instruction fetcher and decoder (not shown) which are adapted to operate upon varying format instructions. The single example of FIG. 7 is for ease in explanation only. Throughout this Application the identification I[] will be used to identify various bits of the instruction. I[31:30] are reserved for future implementations of the execution engine 14. I[29:26] identify the instruction class of the particular instruction. Table 1 shows the various classes of instructions performed by the present invention.

TABLE 1

| Instruction Classes | |
|---|---|
| Class | Instructions |
| 0–3 | Integer and floating point register-to-register instructions |

TABLE 1-continued

Instruction Classes

| Class | Instructions |
|---|---|
| 4 | Immediate constant load |
| 5 | Reserved |
| 6 | Load |
| 7 | Store |
| 8–11 | Control Flow |
| 12 | Modifier |
| 13 | Boolean operations |
| 14 | Reserved |
| 15 | Atomic (extended) |

Instruction classes of particular interest to this Application include the Class 0-3 register-to-register instructions and the Class 13 Boolean operations. While other classes of instructions also operate upon the register file 12, further discussion of those classes is not believed necessary in order to fully understand the present invention.

I[25] is identified as B0, and indicates whether the destination register is in register set A or register set B. I[24:22] are an opcode which identifies, within the given instruction class, which specific function is to be performed. For example, within the register-to-register classes, an opcode may specify "addition". I[21] identifies the addressing mode which is to be used when performing the instruction—either register source addressing or immediate source addressing. I[20:16] identify the destination register as an offset within the register set indicated by B0. ]2115] is identified as B1 and indicates whether the first operand is to be taken from register set A or register set B. I[14:10] identify the register offset from which the first operand is to be taken. I[9:8] identify a function selection—an extension of the opcode I[24:22]. I[7:6] are reserved. I[5] is identified as B2 and indicates whether a second operand of the instruction is to be taken from register set A or register set B. Finally, I[4:0] identify the register offset from which the second operand is to be taken.

With reference to FIG. 1, the integer functional unit 66 and floating point functional unit 68 are equipped to perform integer comparison instructions and floating point comparisons, respectively. The instruction format for the comparison instruction is substantially identical to that shown in FIG. 7, with the caveat that various fields may advantageously be identified by slightly different names. I[20:16] identifies the destination register where the result is to be stored, but the addressing mode field I[21] does not select between register sets A or B. Rather, the addressing mode field indicates whether the second source of the comparison is found in a register or is immediate data. Because the comparison is a Boolean type instruction, the destination register is always found in register set C. All other fields function as shown in FIG. 7. In performing Boolean operations within the integer and floating point functional units, the opcode and function select fields identify which Boolean condition is to be tested for in comparing the two operands. The integer and the floating point functional units fully support the IEEE standards for numerical comparisons.

The IEU 10 is a load/store machine. This means that when the contents of a register are stored to memory or read from memory, an address calculation must be performed in order to determine which location in memory is to be the source or the destination of the store or load, respectively. When this is the case, the destination register field I[20:16] identifies the register which is the destination or the source of the load or store, respectively. The source register 1 field, I[14:10], identifies a register in either set A or B which contains a base address of the memory location. In one embodiment, the source register 2 field, I[4:0], identifies a register in set A or set B which contains an index or an offset from the base. The load/store address is calculated by adding the index to the base. In another mode, I[7:0] include immediate data which are to be added as an index to the base.

B. Operation of the Instruction Execution Unit and Register Sets

It will be understood by those skilled in the art that the integer functional unit 66, the floating point functional unit 68, and the Boolean functional unit 70 are responsive to the contents of the instruction class field, the opcode field, and the function select field of a present instruction being executed.

1. Integer Operations

For example, when the instruction class, the opcode, and function select indicate that an integer register-to-register addition is to be performed, the integer functional unit may be responsive thereto to perform the indicated operation, while the floating point functional unit and the Boolean functional unit may be responsive thereto to not perform the operation. As will be understood from the cross-referenced applications, however, the floating point functional unit 68 is equipped to perform both floating point and integer operations. Also, the functional units are constructed to each perform more than one instruction simultaneously.

The integer functional unit 66 performs integer functions only. Integer operations typically involve a first source, a second source, and a destination. A given integer instruction will specify a particular operation to be performed on one or more source operands and will specify that the result of the integer operation is to be stored at a given destination. In some instructions, such as address calculations employed in load/store operations, the sources are utilized as a base and an index. The integer functional unit 66 is coupled to a first bus 72 over which the integer functional unit 66 is connected to a switching and multiplexing control (SMC) unit A 74 and an SMC unit B 76. Each integer instruction executed by the integer functional unit 66 will specify whether each of its sources and destination reside in register set A or register set B.

Suppose that the IEU 10 has received, from the instruction fetch unit (not shown), an instruction to perform an integer register-to-register addition. In various embodiments, the instruction may specify a register bank, perhaps even a separate bank for each source and destination. In one embodiment, the instruction I[] is limited to a thirty-two-bit length, and does not contain any indication of which register bank 16-0 through 16-n is involved in the instruction. Rather, the bank selector unit 78 controls which register bank is presently active. In one embodiment, the bank selector unit 78 is responsive to one or more bank selection bits in a status word (not shown) within the IEU 10.

In order to perform the integer addition instruction, the integer functional unit 66 is responsive to the identification in I[14:10] and I[4:0] of the first and second source registers. The integer functional unit 66 places an identification of the first and second source registers at ports S1 and S2, respectively, onto the integer functional unit bus 72 which is coupled to both SMC units A and B 74 and 76. In one embodiment, the SMC units A and B are each coupled to receive B0-2 from the instruction I[]. In one embodiment, a zero in any respective Bn indicates register set A, and a one indicates register set B. During load/store operations, the source ports of the integer and floating point functional units 66 and 68 are utilized as a base port and an index port, B and I, respectively.

After obtaining the first and second operands from the indicated register sets on the bus 72, as explained below, the integer functional unit 66 performs the indicated operation upon those operands, and provides the result at port D onto the integer functional unit bus 72. The SMC units A and B are responsive to B0 to route the result to the appropriate register set A or B.

The SMC unit B is further responsive to the instruction class, opcode, and function selection to control whether operands are read from (or results are stored to) either a floating point register RF[] or an integer register RB[]. As indicated, in one embodiment, the registers RF[] may be sixty-four bits wide while the registers are RB[] are only thirty-two bits wide. Thus, SMC unit B controls whether a word or a double word is written to the register set RFB[]. Because all registers within register set A are thirty-two bits wide, SMC unit, A need not include means for controlling the width of data transfer on the bus 42.

All data on the bus 42 are thirty-two bits wide, but other sorts of complexities exist within register set A. The IEU mode integer switch 34 is responsive to the mode control unit 44 of the execution engine 14 to control whether data on the bus 42 are connected through to bus 36, bus 38 or bus 40, and vice versa.

IEU mode integer switch 34 is further responsive to I[20:16], I[14:10], and I[4:0]. If a given indicated destination or source is in RA[23:0], the IEU mode integer switch 34 automatically couples the data between lines 42 and 36. However, for registers RA[31:24], the IEU mode integer switch 34 determines whether data on line 42 is connected to line 38 or line 40, and vice versa. When interrupts are enabled, IEU mode integer switch 34 connects the SMC unit A to the second subset 28 of integer registers RA[31:24]. When interrupts are disabled, the IEU mode integer switch 34 connects the SMC unit A to the shadow registers RT[31:24]. Thus, an instruction executing within the integer functional unit 66 need not be concerned with whether to address RA[31:24] or RT[31:24]. It will be understood that SMC unit A may advantageously operate identically whether it is being accessed by the integer functional unit 66 or by the floating point functional unit 68.

2. Floating Point Operations

The floating point functional unit 68 is responsive to the class, opcode, and function select fields of the instruction, to perform floating point operations. The S1, S2, and D ports operate as described for the integer functional unit 66. SMC unit B is responsive to retrieve floating point operands from, and to write numerical floating point results to, the floating point registers RF[] on bus 52.

3. Boolean Operations

SMC unit C 80 is responsive to the instruction class, opcode, and function select fields of the instruction I[]. When SMC unit C detects that a comparison operation has been performed by one of the numerical functional units 66 or 68, it writes the Boolean result over bus 56 to the Boolean register indicated at the D port of the functional unit which performed the comparison.

The Boolean functional unit 70 does not perform comparison instructions as do the integer and floating point functional units 66 and 68. Rather, the Boolean functional unit 70 is only used in performing bitwise logical combination of Boolean register contents, according to the Boolean functions listed in Table 2.

TABLE 2

Boolean Functions

| I[23,22,9,8] | Boolean result calculation |
| --- | --- |
| 0000 | ZERO |
| 0001 | S1 AND S2 |
| 0010 | S1 AND (NOT S2) |
| 0011 | S1 |
| 0100 | (NOT S1) AND S2 |
| 0101 | S2 |
| 0110 | S1 XOR S2 |
| 0111 | S1 OR S2 |
| 1000 | S1 NOR S2 |
| 1001 | S1 XNOR S2 |
| 1010 | NOT S2 |
| 1011 | S1 OR (NOT S2) |
| 1100 | NOT S1 |
| 1101 | (NOT S1) OR S2 |
| 1110 | S1 NAND S2 |
| 1111 | ONE |

The advantage which the present invention obtains by having a plurality of homogenous Boolean registers, each of which is individually addressable as the destination of a Boolean operation, will be explained with reference to Tables 3–5. Table 3 illustrates an example of a segment of code which performs a conditional branch based upon a complex Boolean function. The complex Boolean function includes three portions which are OR-ed together. The first portion includes two sub-portions, which are AND-ed together.

TABLE 3

Example of Complex Boolean Function

| 1 | RA[1] := 0; |
| 2 | IF (((RA[2] = RA[3]) AND (RA[4] > RA[5])) OR |
| 3 | (RA[6] < RA[7]) OR |
| 4 | (RA[8] <> RA[9])) THEN |
| 5 | X( ) |
| 6 | ELSE |
| 7 | Y( ); |
| 8 | RA[10] := 1; |

Table 4 illustrates, in pseudo-assembly form, one likely method by which previous microprocessors would perform the function of Table 3. The code in Table 4 is written as though it were constructed by a compiler of at least normal intelligence operating upon the code of Table 3. That is, the compiler will recognize that the condition expressed in lines 2–4 of Table 3 is passed if any of the three portions is true.

TABLE 4

Execution of Complex Boolean Function
Without Boolean Register Set

| 1 | START | LDI | RA[1],0 |
| 2 | TEST1 | CMP | RA[2],RA[3] |
| 3 | | BNE | TEST2 |
| 4 | | CMP | RA[4],RA[5] |
| 5 | | BGT | DO_IF |

TABLE 4-continued

Execution of Complex Boolean Function
Without Boolean Register Set

| 6  | TEST2     | CMP | RA[6],RA[7]    |
| 7  |           | BLT | DO_IF          |
| 8  | TEST3     | CMP | RA[8],RA[9]    |
| 9  |           | BEQ | DO_ELSE        |
| 10 | DO_IF     | JSR | ADDRESS OF X( )|
| 11 |           | JMP | PAST_ELSE      |
| 12 | DO_ELSE   | JSR | ADDRESS OF Y( )|
| 13 | PAST_ELSE | LDI | RA[10],1       |

The assignment at line 1 of Table 3 is performed by the "load immediate" statement at line 1 of Table 4. The first portion of the complex Boolean condition, expressed at line 2 of Table 3, is represented by the statements in lines 2–5 of Table 4. To test whether RA[2] equals RA[3], the compare statement at line 2 of Table 4 performs a subtraction of RA[2] from RA[3] or vice versa, depending upon the implementation, and may or may not store the result of that subtraction. The important function performed by the comparison statement is that the zero, minus, and carry flags will be appropriately set or cleared.

The conditional branch statement at line 3 of Table 4 branches to a subsequent portion of code upon the condition that RA[2] did not equal RA[3]. If the two were unequal, the zero flag will be clear, and there is no need to perform the second sub-portion. The existence of the conditional branch statement at line 3 of Table 4 prevents the further fetching, decoding, and executing of any subsequent statement in Table 4 until the results of the comparison in line 2 are known, causing a pipeline stall. If the first sub-portion of the first portion (TEST1) is passed, the second sub-portion at line 4 of Table 4 then compares RA[4] to RA[5], again setting and clearing the appropriate status flags.

If RA[2] equals RA[3], and RA[4] is greater than RA[5], there is no need to test the remaining two portions (TEST2 and TEST3) in the complex Boolean function, and the statement at Table 4, line 5, will conditionally branch to the label DO_IF, to perform the operation inside the "IF" of Table 3. However, if the first portion of the test is failed, additional processing is required to determine which of the "IF" and "ELSE" portions should be executed.

The second portion of the Boolean function is the comparison of RA[6] to RA[7], at line 6 of Table 4, which again sets and clears the appropriate status flags. If the condition "less than" is indicated by the status flags, the complex Boolean function is passed, and execution may immediately branch to the DO_IF label. In various prior microprocessors, the "less than" condition may be tested by examining the minus flag. If RA[7] was not less than RA[6], the third portion of the test must be performed. The statement at line 8 of Table 4 compares RA[8] to RA[9]. If this comparison is failed, the "ELSE" code should be executed; otherwise, execution may simply fall through to the "IF" code at line 10 of Table 4, which is followed by an additional jump around the "ELSE" code. Each of the conditional branches in Table 4, at lines 3, 5, 7 and 9, results in a separate pipeline stall, significantly increasing the processing time required for handling this complex Boolean function.

The greatly improved throughput which results from employing the Boolean register set C of the present invention will now readily be seen with specific reference to Table 5.

TABLE 5

Execution of Complex Boolean Function
With Boolean Register Set

| 1  | START     | LDI | RA[1],0                  |
| 2  | TEST1     | CMP | RC[11],RA[2],RA[3],EQ    |
| 3  |           | CMP | RC[12],RA[4],RA[5],GT    |
| 4  | TEST2     | CMP | RC[13],RA[6],RA[7],LT    |
| 5  | TEST3     | CMP | RC[14],RA[8],RA[9],NE    |
| 6  | COMPLEX   | AND | RC[15],RC[11],RC[12]     |
| 7  |           | OR  | RC[16],RC[13],RC[14]     |
| 8  |           | OR  | RC[17],RC[15],RC[16]     |
| 9  |           | BC  | RC[17],DO_ELSE           |
| 10 | DO_IF     | JSR | ADDRESS OF X( )          |
| 11 |           | JMP | PAST_ELSE                |
| 12 | DO_ELSE   | JSR | ADDRESS OF Y( )          |
| 13 | PAST_ELSE | LDI | RA[10],1                 |

Most notably seen at lines 2–5 of Table 5, the Boolean register set C allows the microprocessor to perform the three test portions back-to-back without intervening branching. Each Boolean comparison specifies two operands, a destination, and a Boolean condition for which to test. For example, the comparison at line 2 of Table 5 compares the contents of RA[2] to the contents of RA[3], tests them for equality, and stores into RC[11] the Boolean value of the result of the comparison. Note that each comparison of the Boolean function stores its respective intermediate results in a separate Boolean register. As will be understood with reference to the above-referenced related applications, the IEU 10 is capable of simultaneously performing more than one of the comparisons.

After at least the first two comparisons at lines 2–3 of Table 5 have been completed, the two respective comparison results are AND-ed together as shown at line 6 of Table 3. RC[15] then holds the result of the first portion of the test. The results of the second and third sub-portions of the Boolean function are OR-ed together as seen in Table 5, line 7. It will be understood that, because there are no data dependencies involved, the AND at line 6 and the OR-ed in line 7 may be performed in parallel. Finally, the results of those two operations are OR-ed together as seen at line 8 of Table 5. It will be understood that register RC[17] will then contain a Boolean value indicating the truth or falsity of the entire complex Boolean function of Table 3. It is then possible to perform a single conditional branch, shown at line 9 of Table 5. In the mode shown in Table 5, the method branches to the "ELSE" code if Boolean register RC[17] is clear, indicating that the complex function was failed. The remainder of the code may be the same as it was without the Boolean register set as seen in Table 4.

The Boolean functional unit 70 is responsive to the instruction class, opcode, and function select fields as are the other functional units. Thus, it will be understood with reference to Table 5 again, that the integer and/or floating point functional units will perform the instructions in lines 1–5 and 13, and the Boolean functional unit 70 will perform the Boolean bitwise combination instructions in lines 6–8. The control flow and branching instructions in line 9–12 will be performed by elements of the IEU 10 which are not shown in FIG. 1.

III. DATA PATHS

FIGS. 2–5 illustrate further details of the data paths within the floating point, integer, and Boolean portions of the IEU, respectively.

A. Floating Point Portion Data Paths

Figure 2:
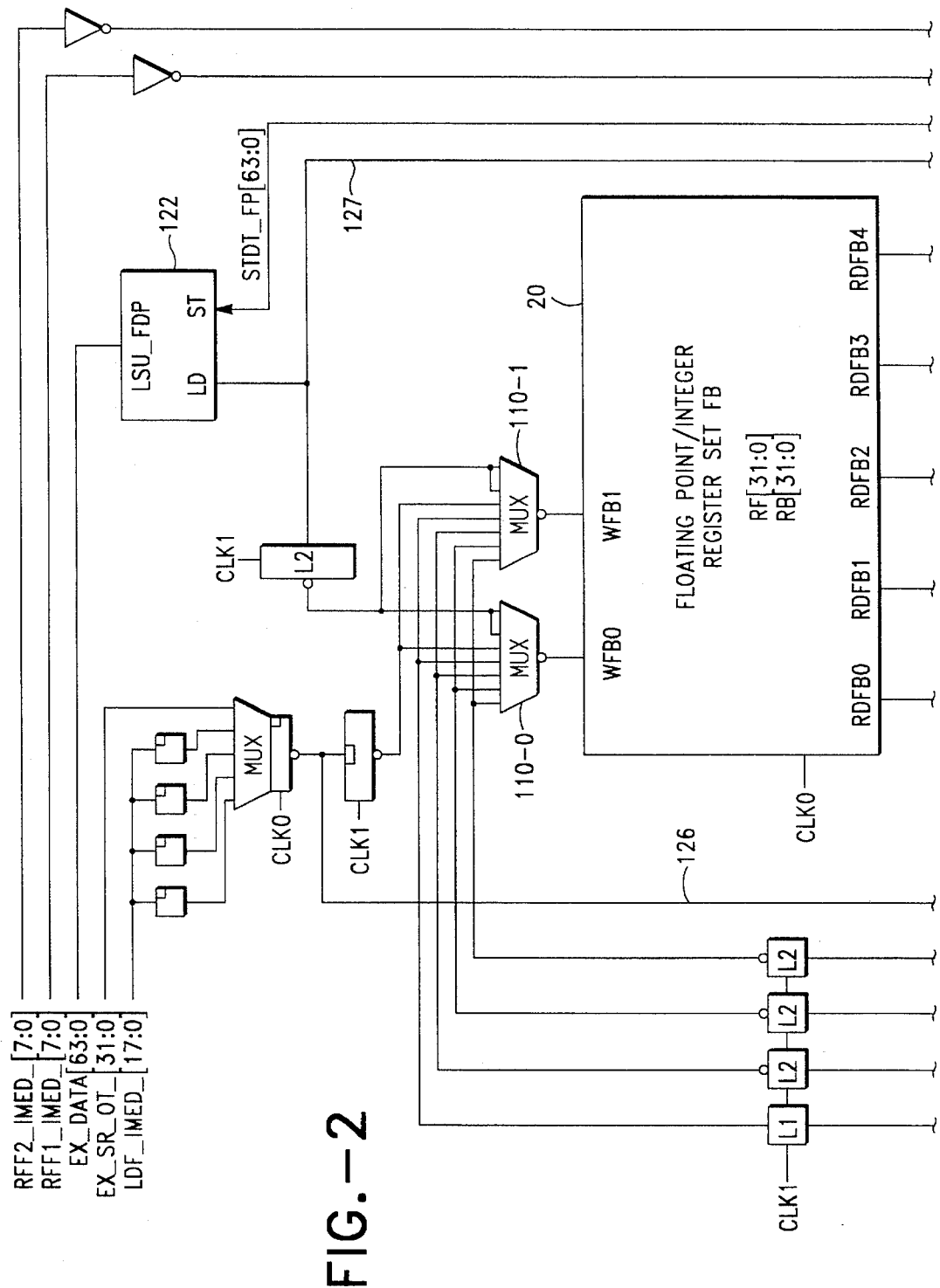
FIGS. 2, 3 and 4 are simplified schematic and block diagrams of the floating point, integer and Boolean portions of the instruction execution unit of FIG. 1, respectively.
Figure 2A:
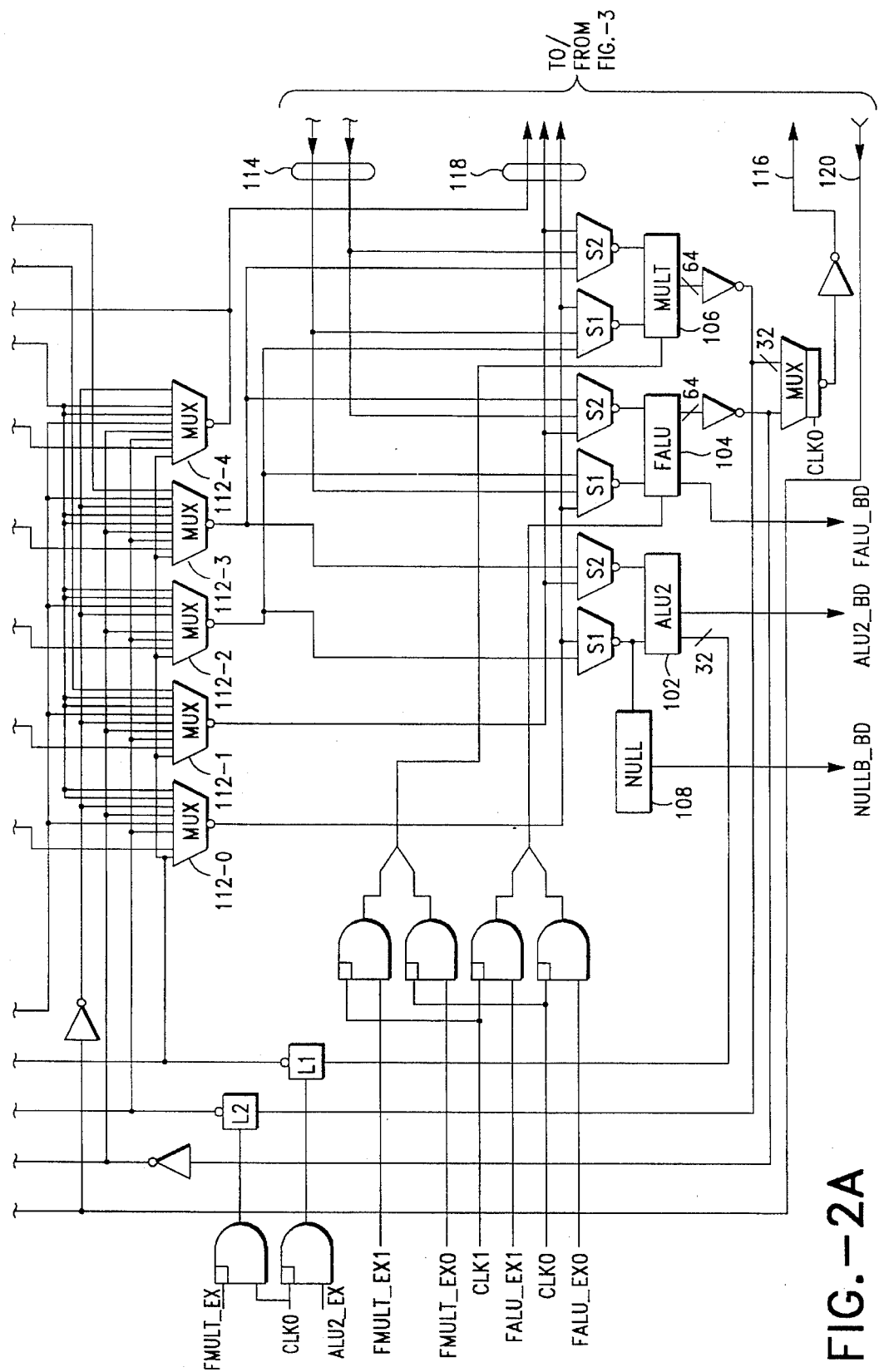

As seen in FIG. 2, the register set FB 20 is a multi-ported register set. In one embodiment, the register set FB 20 has two write ports WFB0–1, and five read ports RDFB0–4. The floating point functional unit 68 of FIG. 1 is comprised of the ALU2 102, FALU 104, MULT 106, and NULL 108 of FIG. 2. All elements of FIG. 2 except the register set 20 and the elements 102–108 comprise the SMC unit B of FIG. 1.

External, bidirectional data bus EX_DATA[] provides data to the floating point load/store unit 122. Immediate floating point data bus LDF_IMED[] provides data from a "load immediate" instruction. Other immediate floating point data are provided on busses RFF1_IMED and RFF2_IMED, such as is involved in an "add immediate" instruction. Data are also provided on bus EX_SR_DT[], in response to a "special register move" instruction. Data may also arrive from the integer portion, shown in FIG. 3, on busses 114 and 120.

The floating point register set's two write ports WFB0 and WFB1 are coupled to write multiplexers 110-0 and 110-1, respectively. The write multiplexers 110 receive data from: the ALU0 or SHF0 of the integer portion of FIG. 3; the FALU; the MULT; the ALU2; either EX_SR_DT[] or LDF_IMED[]; and EX_DATA[]. Those skilled in the art will understand that control signals (not shown) determine which input is selected at each port, and address signals (not shown) determine to which register the input data are written. Multiplexer control and register addressing are within the skill of persons in the art, and will not be discussed for any multiplexer or register set in the present invention.

The floating point register set's five read ports RDFB0 to RDFB4 are coupled to read multiplexers 112-0 to 112-4, respectively. The read multiplexers each also receives data from: either EX_SR_DT[] or LDF_IMED[], on load immediate bypass bus 126; a load external data bypass bus 127, which allows external load data to skip the register set FB; the output of the ALU2 102, which performs non-multiplication integer operations; the FALU 104, which performs non-multiplication floating point operations; the MULT 106, which performs multiplication operations; and either the ALU0 140 or the SHF0 144 of the integer portion shown in FIG. 3, which respectively perform non-multiplication integer operations and shift operations. Read multiplexers 112-1 and 112-3 also receive data from RFF1_IMED[] and RFF2_IMED[], respectively.

Each arithmetic-type unit 102–106 in the floating point portion receives two inputs, from respective sets of first and second source multiplexers S1 and S2. The first source of each unit ALU2, FALU, and MULT comes from the output of either read multiplexer 112-0 or 112-2, and the second source comes from the output of either read multiplexer 112-1 or 112-3. The sources of the FALU and the MULT may also come from the integer portion of FIG. 3 on bus 114.

The results of the ALU2, FALU, and MULT are provided back to the write multiplexers 110 for storage into the floating point registers RF[], and also to the read multiplexers 112 for re-use as operands of subsequent operations. The FALU also outputs a signal FALU_BD indicating the Boolean result of a floating point comparison operation. FALU_BD is calculated directly from internal zero and sign flags of the FALU.

Null byte tester NULL 108 performs null byte testing operations upon an operand from a first source multiplexer, in one mode that of the ALU2. NULL 108 outputs a Boolean signal NULLB_BD indicating whether the thirty-two-bit first source operand includes a byte of value zero.

The outputs of read multiplexers 112-0, 112-1, and 112-4 are provided to the integer portion (of FIG. 3) on bus 118. The output of read multiplexer 112-4 is also provided as STDT_FP[] store data to the floating point load/store unit 122.

Figure 5:
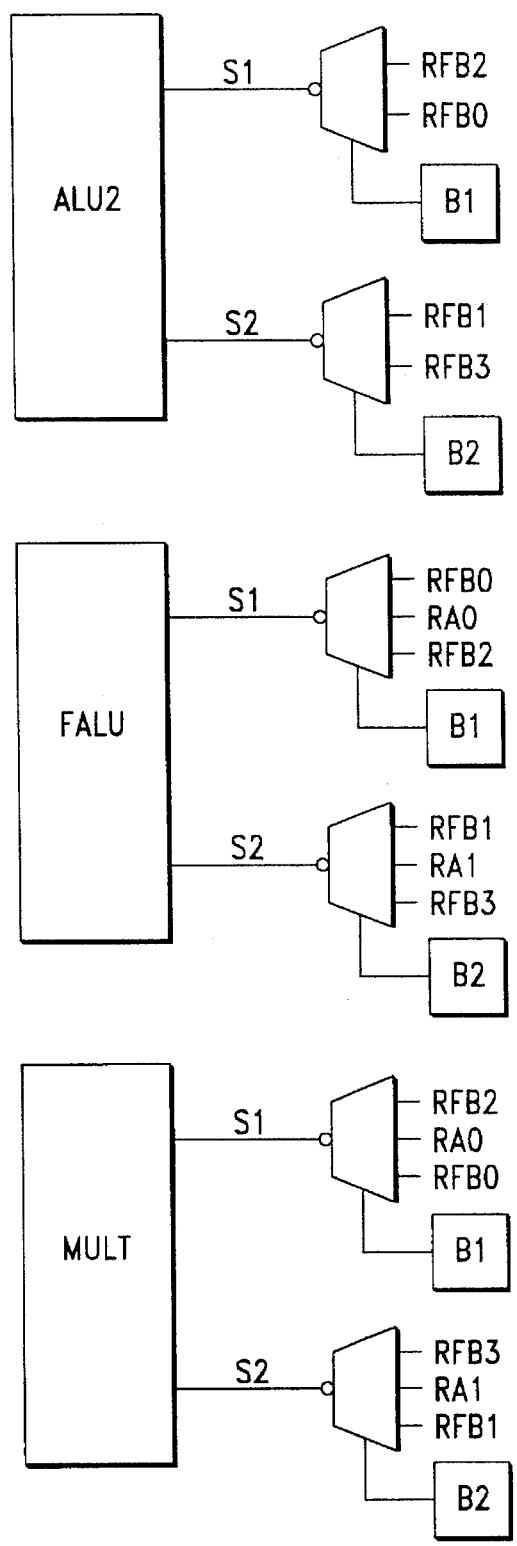
FIGS. 5–6 are more detailed views of the floating point and integer portions, respectively, showing the means for selecting between register sets.

FIG. 5 illustrates further details of the control of the S1 and S2 multiplexers. As seen, in one embodiment, each S1 multiplexer may be responsive to bit B1 of the instruction I[], and each S2 multiplexer may be responsive to bit B2 of the instruction I[]. The S1 and S2 multiplexers select the sources for the various functional units. The sources may come from either of the register files, as controlled by the B1 and B2 bits of the instruction itself. Additionally, each register file includes two read ports from which the sources may come, as controlled by hardware not shown in the Figs.

B. Integer Portion Data Paths

Figure 3:
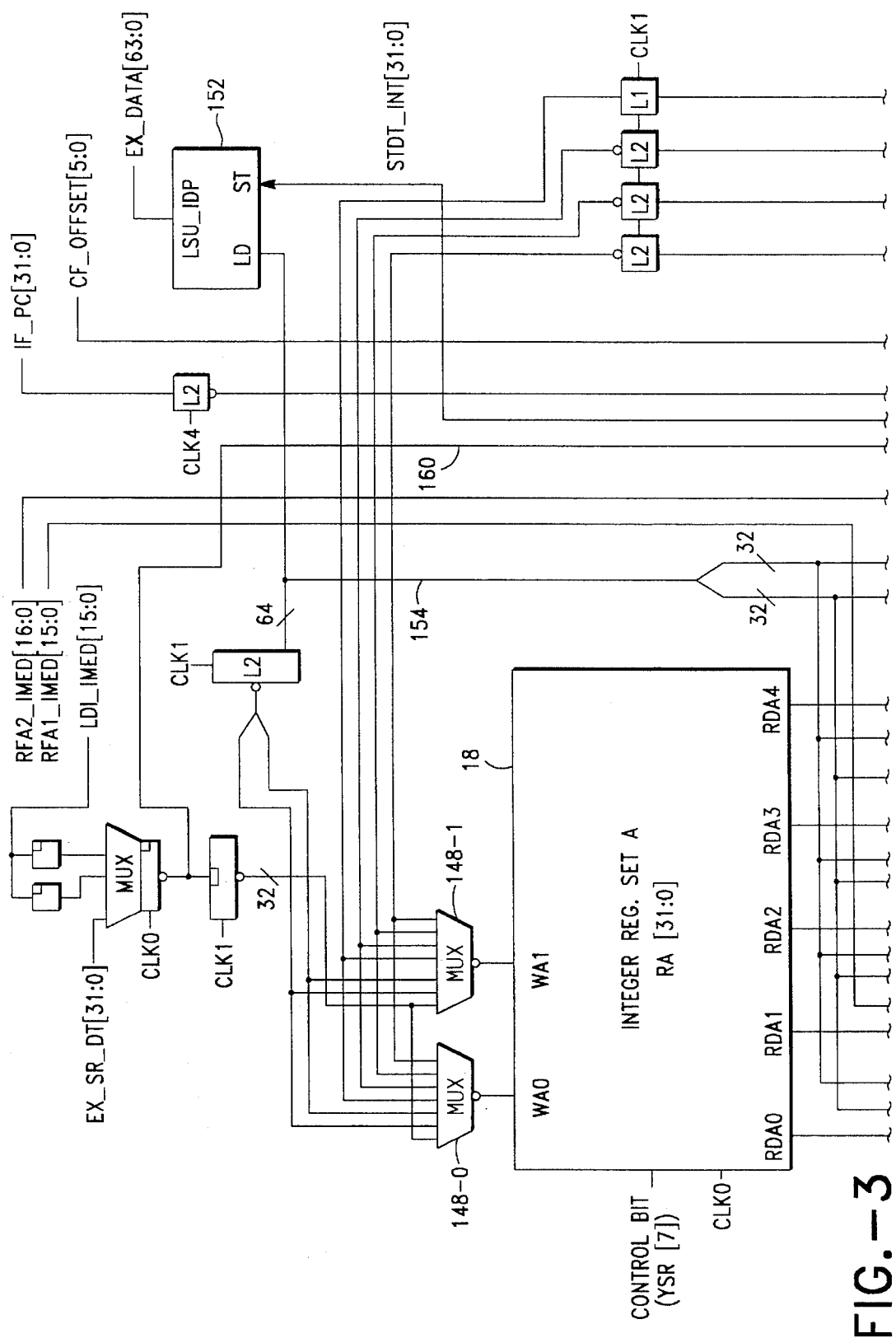

As seen in FIG. 3, the register set A 18 is also multi-ported. In one embodiment, the register set A 18 has two write ports WA0–1, and five read ports RDA0–4. The integer functional unit 66 of FIG. 1 is comprised of the ALU0 140, ALU1 142, SHF0 144, and NULL 146 of FIG. 3. All elements of FIG. 3 except the register set 18 and the elements 140–146 comprise the SMC unit A of FIG. 1.

External data bus EX_DATA[] provides data to the integer load/store unit 152. Immediate integer data on bus LDI_IMED[] are provided in response to a "load immediate" instruction. Other immediate integer data are provided on busses RFA1_IMED and RFA2_IMED in response to non-load immediate instructions, such as an "add immediate". Data are also provided on bus EX_SR_DT[] in response to a "special register move" instruction. Data may also arrive from the floating point portion (shown in FIG. 2) on busses 116 and 118.

The integer register set's two write ports WA0 and WA1 are coupled to write multiplexers 148-0 and 148-1, respectively. The write multiplexers 148 receive data from: the FALU or MULT of the floating point portion (of FIG. 2); the ALU0; the ALU1; the SHF0; either EX_SR_DT[] or LDI_IMED[]; and EX_DATA[].

The integer register set's five read ports RDA0 to RDA4 are coupled to read multiplexers 150-0 to 150-4, respectively. Each read multiplexer also receives data from: either EX_SR_DT[] or LDI_IMED[] on load immediate bypass bus 160; a load external data bypass bus 154, which allows external load data to skip the register set A; ALU0; ALU1; SHF0; and either the FALU or the MULT of the floating point portion (of FIG. 2). Read multiplexers 150-1 and 150-3 also receive data from RFA1_IMED[] and RFA2_IMED[], respectively.

Each arithmetic-type unit 140–144 in the integer portion receives two inputs, from respective sets of first and second source multiplexers S1 and S2. The first source of ALU0 comes from either the output of read multiplexer 150-2, or a thirty-two-bit wide constant zero ($0000_{hex}$), or floating point read multiplexer 112-4. The second source of ALU0 comes from either read multiplexer 150-3 or floating point read multiplexer 112-1. The first source of ALU1 comes from either read multiplexer 150-0 or IF_PC[]. IF_PC[] is used in calculating a return address needed by the instruction fetch unit (not shown), due to the IEU's ability to perform instructions in an out-of-order sequence. The second source of ALU1 comes from either read multiplexer 150-1 or CF_OFFSET[]. CF_OFFSET[] is used in calculating a return address for a CALL instruction, also due to the out-of-order capability.

The first source of the shifter SHF0 144 is from either: floating point read multiplexer 112-0 or 112-4; or any integer read multiplexer 150. The second source of SHF0 is from either: floating point read multiplexer 112-0 or 112-4; or integer read multiplexer 150-0, 150-2, or 150-4. SHF0 takes a third input from a shift amount multiplexer (SA). The third input controls how far to shift, and is taken by the SA multiplexer from either: floating point read multiplexer 112-1; integer read multiplexer 150-1 or 150-3; or a five-bit wide constant thirty-one ($11111_2$ or $31_{10}$). The shifter SHF0 requires a fourth input from the size multiplexer (S). The fourth input controls how much data to shift, and is taken by the S multiplexer from either: read multiplexer 150-1; read multiplexer 150-3; or a five-bit wide constant sixteen ($10000_2$ or $16_{10}$).

The results of the ALU0, ALU1, and SHF0 are provided back to the write multiplexers 148 for storage into the integer registers RA[], and also to the read multiplexers 150 for re-use as operands of subsequent operations. The output of either ALU0 or SHF0 is provided on bus 120 to the floating point portion of FIG. 3. The ALU0 and ALU1 also output signals ALU0_BD and ALU1_BD, respectively, indicating the Boolean results of integer comparison operations. ALU0_BD and ALU1_BD are calculated directly from the zero and sign flags of the respective functional units. ALU0 also outputs signals EX_TADR[] and EX_VM_ADR. EX_TADR[] is the target address generated for an absolute branch instruction, and is sent to the IFU (not shown) for fetching the target instruction. EX_VM_ADR[] is the virtual address used for all loads from memory and stores to memory, and is sent to the VMU (not shown) for address translation.

Null byte tester NULL 146 performs null byte testing operations upon an operand from a first source multiplexer. In one embodiment, the operand is from the ALU0. NULL 146 outputs a Boolean signal NULLA_BD indicating whether the thirty-two-bit first source operand includes a byte of value zero.

The outputs of read multiplexers 150-0 and 150-1 are provided to the floating point portion (of FIG. 2) on bus 114. The output of read multiplexer 150-4 is also provided as STDT_INT[] store data to the integer load/store unit 152.

A control bit PSR[7] is provided to the register set A 18. It is this signal which, in FIG. 1, is provided from the mode control unit 44 to the IEU mode integer switch 34 on line 46. The IEU mode integer switch is internal to the register set A 18 as shown in FIG. 3.

Figure 4:
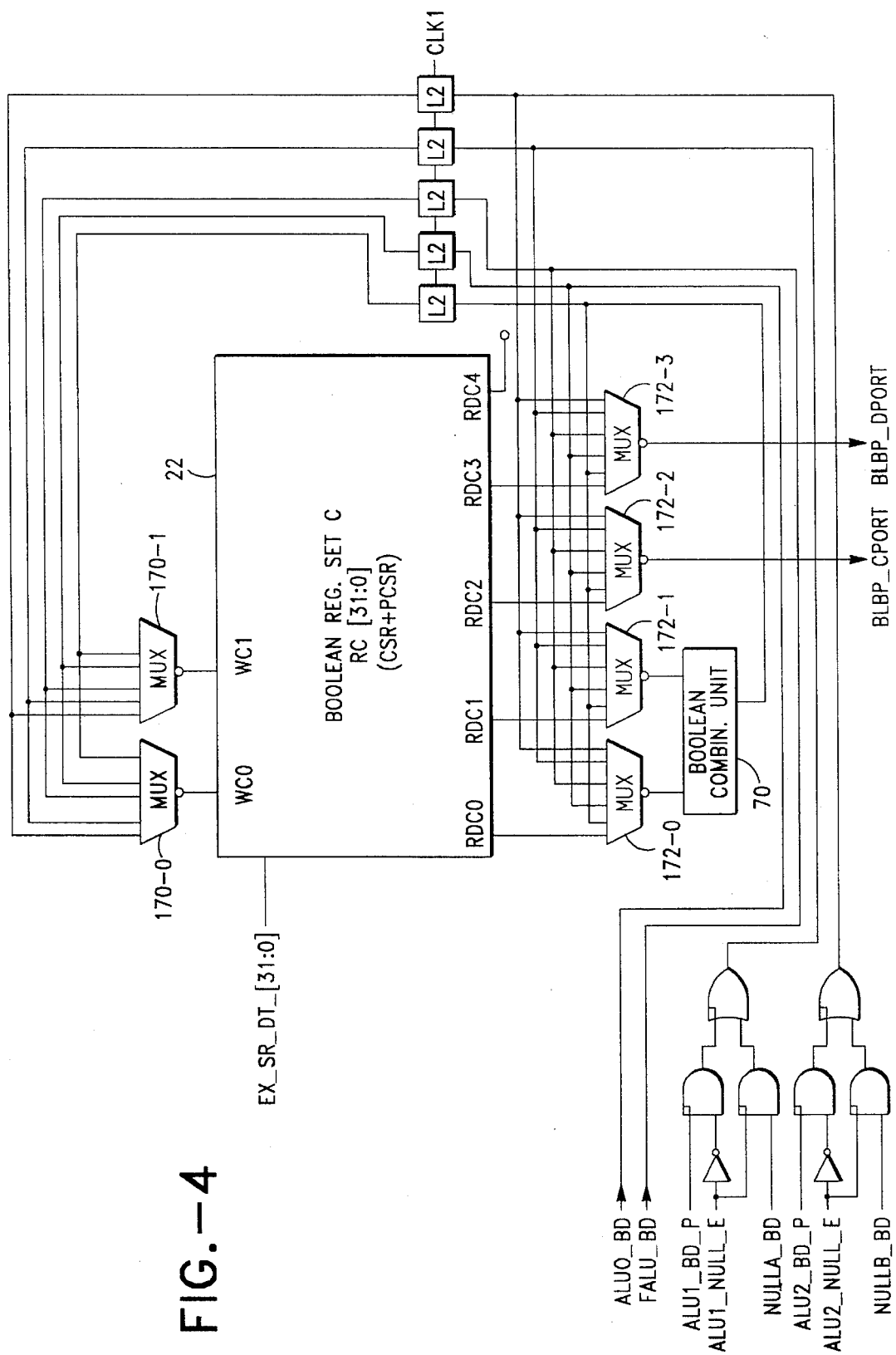
Figure 6:
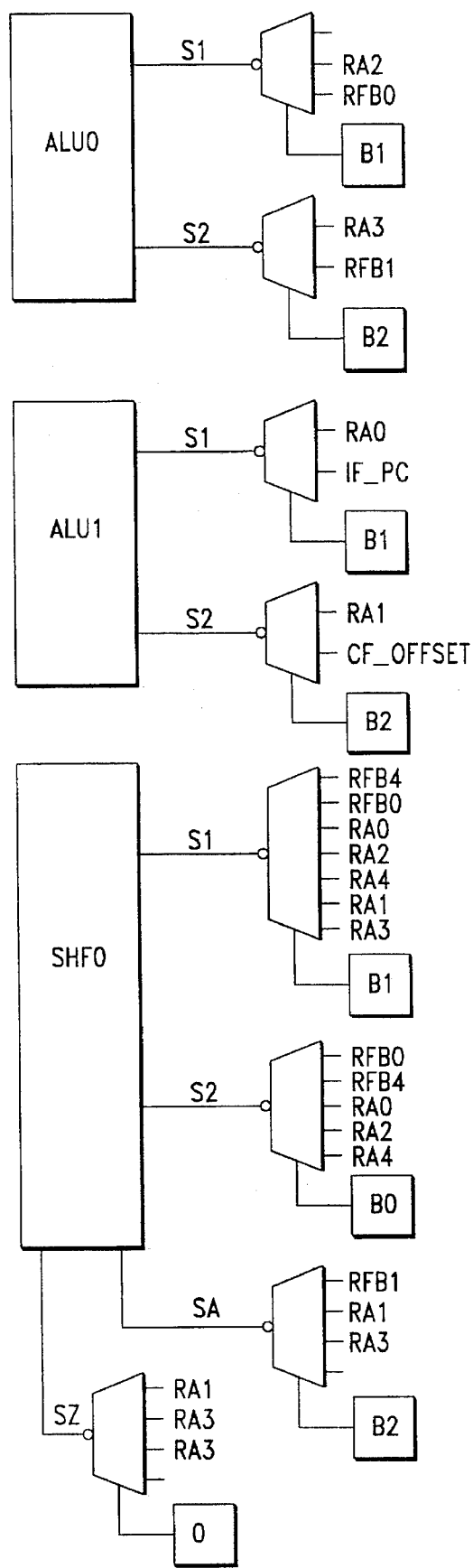

FIG. 6 illustrates further details of the control of the S1 and S2 multiplexers. The signal ALU0_BD C. Boolean Portion Data Paths As seen in FIG. 4, the register set C 22 is also multiported. In one embodiment, the register set C 22 has two write ports WC0–1, and five read ports RDA0–4. All elements of FIG. 4 except the register set 22 and the Boolean combinational unit 70 comprise the SMC unit C of FIG. 1.

The Boolean register set's two write ports WC0 and WC1 are coupled to write multiplexers 170-0 and 170-1, respectively. The write multiplexers 170 receive data from: the output of the Boolean combinational unit 70, indicating the Boolean result of a Boolean combinational operation; ALU0_BD from the integer portion of FIG. 3, indicating the Boolean result of an integer comparison; FALU_BD from the floating point portion of FIG. 2, indicating the Boolean result of a floating point comparison; either ALU1_BD_P from ALU1, indicating the results of a compare instruction in ALU1, or NULLA_BD from NULL 146, indicating a null byte in the integer portion; and either ALU2_BD_P from ALU2, indicating the results of a compare operation in ALU2, or NULLB_BD from NULL 108, indicating a null byte in the floating point portion. In one mode, the ALU0_BD, ALU1_BD, ALU2_BD, and FALU_BD signals are not taken from the data paths, but are calculated as a function of the zero flag, minus flag, carry flag, and other condition flags in the PSR. In one mode, wherein up to eight instructions may be executing at one instant in the IEU, the IEU maintains up to eight PSRs.

The Boolean register set C is also coupled to bus EX_SR_DT[], for use with "special register move" instructions. The CSR may be written or read as a whole, as though it were a single thirty-two-bit register. This enables rapid saving and restoration of machine state information, such as may be necessary upon certain drastic system errors or upon certain forms of grand scale context switching.

The Boolean register set's five read ports RDC0 to RDC3 are coupled to read multiplexers 172-0 to 172-4, respectively. The read multiplexers 172 receive the same set of inputs as the write multiplexers 170 receive. The Boolean combinational unit 70 receives inputs from read multiplexers 170-0 and 170-1. Read multiplexers 172-2 and 172-3 respectively provide signals BLBP_CPORT and BLBP_DPORT. BLBP_CPORT is used as the basis for conditional branching instructions in the IEU. BLBP_DPORT is used in the "add with Boolean" instruction, which sets an integer register in the A or B set to zero or one (with leading zeroes), depending upon the content of a register in the C set. Read port RDC4 is presently unused, and is reserved for future enhancements of the Boolean functionality of the IEU.

IV. CONCLUSION

While the features and advantages of the present invention have been described with respect to particular embodiments thereof, and in varying degrees of detail, it will be appreciated that the invention is not limited to the described embodiments. The following claims define the invention to be afforded patent coverage.

We claim:

1. In a data processing system, which includes a central processing unit (CPU) which performs operations according to an instruction, the operations operating upon integer data, a data register system comprising:

a first register set including a plurality of first registers each for holding the integer data;

a second register set including a plurality of second registers each for holding the integer data and for holding floating point data, wherein the instruction includes a field specifying which of the first and second register sets is to be accessed in response to the instruction;

means, responsive to the field, for accessing the first register set or the second register set as specified by the field, including i) reading means for reading an operand value from either the first register set or second register set as specified by the field, and ii) writing mean for writing a result value to the first register set or the second register set as specified by the field.

2. The apparatus of claim 1, wherein said first and second register sets each have two write ports and five read ports.

3. An apparatus comprising:

execution means for executing instructions, the instructions performing operations upon operands to generate results, each instruction specifying a respective source address for each operand and a destination address for the result of the instruction, each address specifying a register set and an offset;

a first register set including a plurality of individually addressable registers each for storing integer values;

first access means for writing and reading values to and from the first register set according to a given instruction, the first access means including,
  i) first reading means, responsive to the given instruction having a given source address which specifies the first register set as a source for an operand of the given instruction, for reading the operand's value from the first register set at the offset specified by the given source address, and
  ii) first writing means, responsive to the given instruction having a given destination address which specifies the first register set as a destination for the result of the given instruction, for writing the result's value to the first register set at the offset specified by the given destination address;

a second register set including a plurality of individually addressable registers, wherein each addressable register is configured to store floating point values and integer values; and second access means for writing and reading integer and floating point values to and from the second register set according to the given instruction, the second access means including,
  i) second reading means, responsive to the given instruction having a given source address which specifies the second register set as a source for an operand of the given instruction, for reading the operand's value from the second register set at the offset specified by the given source address, and
  ii) second writing means, responsive to the given instruction having a given destination address which specifies the second register set as a destination for the result of the given instruction, for writing the result's value to the second register set at the offset specified by the given destination address.

4. The apparatus of claim 3, wherein:

a given instruction may specify a first and a second source address and a destination address, with each address specifying either of the first or second register sets such that the given instruction requires access to both register sets; and the first and second access means operate simultaneously to provide the instruction parallel access to both the first and second register sets.

5. The apparatus of claim 2, wherein said first and second register sets each have two write ports and five read ports.

* * * * *

US005493687C1

(12) EX PARTE REEXAMINATION CERTIFICATE (6648th)
United States Patent
Garg et al.

(10) Number: US 5,493,687 C1
(45) Certificate Issued: Feb. 10, 2009

(54) RISC MICROPROCESSOR ARCHITECTURE IMPLEMENTING MULTIPLE TYPED REGISTER SETS

(75) Inventors: Sanjiv Garg, Fremont, CA (US); Derek J. Lentz, Los Gatos, CA (US); Le T. Nguyen, Monte Sereno, CA (US); Sho L. Chen, Saratoga, CA (US)

(73) Assignee: Transmeta Corporation, Santa Clara, CA (US)

Reexamination Request:
No. 90/008,585, Apr. 12, 2007

Reexamination Certificate for:
Patent No.: 5,493,687
Issued: Feb. 20, 1996
Appl. No.: 07/726,773
Filed: Jul. 8, 1991

(51) Int. Cl.
*G06F 9/38* (2006.01)
*G06F 9/305* (2006.01)
*G06F 9/30* (2006.01)

(52) U.S. Cl. .................. 712/23; 712/208; 712/225; 712/226; 712/E9.018; 712/E9.025; 712/E9.027; 712/E9.053

(58) Field of Classification Search ................ None
See application file for complete search history.

(56) References Cited

U.S. PATENT DOCUMENTS

| 3,346,851 | A | 10/1967 | Thornton et al. |
| 3,718,912 | A | 2/1973 | Hasbrouck et al. |
| 3,771,138 | A | 11/1973 | Celtruda et al. |
| 3,789,365 | A | 1/1974 | Jen et al. |
| 3,913,074 | A | 10/1975 | Homberg et al. |
| 4,034,349 | A | 7/1977 | Monaco et al. |
| 4,128,880 | A | 12/1978 | Cray, Jr. |
| 4,200,927 | A | 4/1980 | Hughes et al. |
| 4,228,495 | A | 10/1980 | Bernhard et al. |
| 4,296,470 | A | 10/1981 | Fairchild et al. |
| 4,315,308 | A | 2/1982 | Jackson |

(Continued)

FOREIGN PATENT DOCUMENTS

| EP | 0 354 585 | 2/1990 |
| EP | 0 378 195 | 7/1990 |
| EP | 0 515 166 | 11/1992 |

(Continued)

OTHER PUBLICATIONS

Complaint, 7 pges, dated Oct. 11, 2006, in *Transmeta Corporation v. Intel Corporation*, in the U.S. District Court for the District of Delaware, Case No. 1:06–cv–00633.

(Continued)

*Primary Examiner*—Deandra M Hughes

(57) ABSTRACT

A register system for a data processor which operates in a plurality of modes. The register system provides multiple, identical banks of register sets, the data processor controlling access such that instructions and processes need not specify any given bank. An integer register set includes first (RA[23:0]) and second (RA[31:24]) subsets, and a shadow subset (RT[31:24]). While the data processor is in a first mode, instructions access the first and second subsets. While the data processor is in a second mode, instructions may access the first subset, but any attempts to access the second subset are re-routed to the shadow subset instead, transparently to the instructions, allowing system routines to seemingly use the second subset without having to save and restore data which user routines have written to the second subset. A re-typable register set provides integer width data and floating point width data in response to integer instructions and floating point instructions, respectively. Boolean comparison instructions specify particular integer or floating point registers for source data to be compared, and specify a particular Boolean register for the result, so there are no dedicated, fixed-location status flags. Boolean combinational instructions combine specified Boolean registers, for performing complex Boolean comparisons without intervening conditional branch instructions, to minimize pipeline disruption.

U.S. PATENT DOCUMENTS

| | | |
|---|---|---|
| 4,315,314 A | 2/1982 | Russo |
| 4,410,939 A | 10/1983 | Kawakami |
| 4,434,461 A | 2/1984 | Puhl |
| 4,459,657 A | 7/1984 | Murao |
| 4,476,525 A | 10/1984 | Ishii |
| 4,482,950 A | 11/1984 | Dshkhunian et al. |
| 4,498,134 A | 2/1985 | Hansen et al. |
| 4,500,963 A | 2/1985 | Smith et al. |
| 4,532,598 A | 7/1985 | Shibayama et al. |
| 4,561,051 A | 12/1985 | Rodman |
| 4,574,349 A | 3/1986 | Rechtschaffen |
| 4,594,655 A | 6/1986 | Hao et al. |
| 4,597,054 A | 6/1986 | Lockwood et al. |
| 4,613,941 A | 9/1986 | Smith et al. |
| 4,626,989 A | 12/1986 | Torii |
| 4,644,466 A | 2/1987 | Saito |
| 4,648,045 A | 3/1987 | Demetrescu |
| 4,675,806 A | 6/1987 | Uchida |
| 4,714,994 A | 12/1987 | Oklobdzija et al. |
| 4,719,569 A | 1/1988 | Ludemann et al. |
| 4,722,049 A | 1/1988 | Lahti |
| 4,752,873 A | 6/1988 | Shonai et al. |
| 4,758,948 A | 7/1988 | May et al. |
| 4,766,566 A | 8/1988 | Chuang |
| 4,775,927 A | 10/1988 | Hester et al. |
| 4,791,607 A | 12/1988 | Igarashi et al. |
| 4,807,115 A | 2/1989 | Torng |
| 4,811,208 A | 3/1989 | Myers et al. |
| 4,814,978 A | 3/1989 | Dennis |
| 4,823,201 A | 4/1989 | Simon et al. |
| 4,829,467 A | 5/1989 | Ogata |
| 4,833,599 A | 5/1989 | Colwell et al. |
| 4,841,453 A | 6/1989 | Finlay et al. |
| 4,858,105 A | 8/1989 | Kuriyama et al. |
| 4,858,116 A | 8/1989 | Gillett, Jr. et al. |
| 4,881,167 A | 11/1989 | Sasaki et al. |
| 4,897,810 A | 1/1990 | Nix |
| 4,901,228 A | 2/1990 | Kodama |
| 4,901,233 A | 2/1990 | Liptay |
| 4,903,196 A | 2/1990 | Pomerene et al. |
| 4,916,604 A | 4/1990 | Yamamoto et al. |
| 4,924,376 A | 5/1990 | Ooi |
| 4,926,323 A | 5/1990 | Baror et al. |
| 4,928,226 A | 5/1990 | Kamada et al. |
| 4,942,525 A | 7/1990 | Shintani et al. |
| 4,945,479 A | 7/1990 | Rusterholz et al. |
| 4,964,057 A | 10/1990 | Yabe |
| 4,974,154 A | 11/1990 | Matsuo |
| 4,974,155 A | 11/1990 | Dulong et al. |
| 4,980,817 A | 12/1990 | Fossum et al. |
| 4,985,825 A | 1/1991 | Webb, Jr. et al. |
| 4,991,078 A | 2/1991 | Wilhelm et al. |
| 4,991,081 A | 2/1991 | Bosshart |
| 4,992,938 A | 2/1991 | Cocke et al. |
| 5,003,462 A | 3/1991 | Blaner et al. |
| 5,032,985 A | 7/1991 | Curran |
| 5,051,925 A | 9/1991 | Kadono et al. |
| 5,067,069 A | 11/1991 | Fite et al. |
| 5,072,364 A | 12/1991 | Jardine et al. |
| 5,089,951 A | 2/1992 | Iijima |
| 5,093,783 A | 3/1992 | Kitada |
| 5,097,409 A | 3/1992 | Schwartz et al. |
| 5,101,341 A | 3/1992 | Circello et al. |
| 5,109,495 A | 4/1992 | Fite et al. |
| 5,119,485 A | 6/1992 | Ledbetter, Jr. et al. |
| 5,120,083 A | 6/1992 | Stine |
| 5,125,083 A | 6/1992 | Fite et al. |
| 5,127,091 A | 6/1992 | Boufarah et al. |
| 5,129,067 A | 7/1992 | Johnson |
| 5,133,074 A | 7/1992 | Chou |
| 5,133,077 A | 7/1992 | Karne et al. |
| 5,134,561 A | 7/1992 | Liptay |
| 5,136,697 A | 8/1992 | Johnson |
| 5,140,682 A | 8/1992 | Okura et al. |
| 5,142,633 A | 8/1992 | Murray et al. |
| 5,142,634 A | 8/1992 | Fite et al. |
| 5,148,533 A | 9/1992 | Joyce et al. |
| 5,148,536 A | 9/1992 | Witek et al. |
| 5,150,309 A | 9/1992 | Shaw et al. |
| 5,155,843 A | 10/1992 | Stamm et al. |
| 5,167,026 A | 11/1992 | Murray et al. |
| 5,167,035 A | 11/1992 | Mann et al. |
| 5,179,530 A | 1/1993 | Genusov et al. |
| 5,179,673 A | 1/1993 | Steely, Jr. et al. |
| 5,179,689 A | 1/1993 | Leach et al. |
| 5,185,872 A | 2/1993 | Arnold et al. |
| 5,185,878 A | 2/1993 | Baror et al. |
| 5,187,796 A | 2/1993 | Wang et al. |
| 5,193,157 A | 3/1993 | Barbour et al. |
| 5,197,132 A | 3/1993 | Steely, Jr. et al. |
| 5,197,136 A | 3/1993 | Kimura et al. |
| 5,214,763 A | 5/1993 | Blaner et al. |
| 5,214,786 A | 5/1993 | Watanabe et al. |
| 5,222,223 A | 6/1993 | Webb, Jr. et al. |
| 5,222,240 A | 6/1993 | Patel |
| 5,222,244 A | 6/1993 | Carbine et al. |
| 5,226,125 A | 7/1993 | Balmer et al. |
| 5,226,126 A | 7/1993 | McFarland et al. |
| 5,226,166 A | 7/1993 | Ishida et al. |
| 5,226,170 A | 7/1993 | Rubinfeld |
| 5,228,136 A | 7/1993 | Shimizu et al. |
| 5,230,068 A | 7/1993 | Van Dyke et al. |
| 5,233,694 A | 8/1993 | Hotta et al. |
| 5,237,666 A | 8/1993 | Suzuki et al. |
| 5,249,286 A | 9/1993 | Alpert et al. |
| 5,251,306 A | 10/1993 | Tran |
| 5,255,384 A | 10/1993 | Sachs et al. |
| 5,261,057 A | 11/1993 | Coyle et al. |
| 5,261,071 A | 11/1993 | Lyon |
| 5,276,899 A | 1/1994 | Neches |
| 5,278,963 A | 1/1994 | Hattersley et al. |
| H1291 H | 2/1994 | Hinton et al. |
| 5,283,903 A | 2/1994 | Uehara |
| 5,285,527 A | 2/1994 | Crick et al. |
| 5,287,465 A | 2/1994 | Kurosawa et al. |
| 5,287,467 A | 2/1994 | Blaner et al. |
| 5,291,615 A | 3/1994 | Okamoto |
| 5,293,500 A | 3/1994 | Ishida et al. |
| 5,301,278 A | 4/1994 | Bowater et al. |
| 5,303,362 A | 4/1994 | Butts, Jr. et al. |
| 5,303,382 A | 4/1994 | Buch et al. |
| 5,317,720 A | 5/1994 | Stamm et al. |
| 5,345,569 A | 9/1994 | Tran |
| 5,355,457 A | 10/1994 | Shebanow et al. |
| 5,355,460 A | 10/1994 | Eickemeyer et al. |
| 5,367,660 A | 11/1994 | Gat et al. |
| 5,371,684 A | 12/1994 | Iadonato et al. |
| 5,377,339 A | 12/1994 | Saito et al. |
| 5,388,215 A | 2/1995 | Baker et al. |
| 5,390,355 A | 2/1995 | Horst |
| 5,394,351 A | 2/1995 | Widigen et al. |
| 5,394,515 A | 2/1995 | Lentz et al. |
| 5,394,529 A | 2/1995 | Brown, III et al. |
| 5,398,330 A | 3/1995 | Johnson |
| 5,404,470 A | 4/1995 | Miyake |
| 5,404,472 A | 4/1995 | Kurosawa et al. |
| 5,430,884 A | 7/1995 | Beard et al. |
| 5,430,888 A | 7/1995 | Witek et al. |
| 5,436,869 A | 7/1995 | Yoshida |
| 5,440,752 A | 8/1995 | Lentz et al. |
| 5,442,757 A | 8/1995 | McFarland et al. |

| Patent | Date | Inventor |
|---|---|---|
| 5,446,912 A | 8/1995 | Colwell et al. |
| 5,448,705 A | 9/1995 | Nguyen et al. |
| 5,452,426 A | 9/1995 | Papworth et al. |
| 5,461,715 A | 10/1995 | Matsuo et al. |
| 5,471,592 A | 11/1995 | Gove et al. |
| 5,473,764 A | 12/1995 | Chi |
| 5,481,685 A | 1/1996 | Nguyen et al. |
| 5,481,734 A | 1/1996 | Yoshida |
| 5,487,156 A | 1/1996 | Popescu et al. |
| 5,488,729 A | 1/1996 | Vegesna et al. |
| 5,490,280 A | 2/1996 | Gupta et al. |
| 5,497,499 A | 3/1996 | Garg et al. |
| 5,524,225 A | 6/1996 | Kranich |
| 5,539,911 A | 7/1996 | Nguyen et al. |
| 5,559,951 A | 9/1996 | Lentz et al. |
| 5,560,032 A | 9/1996 | Nguyen et al. |
| 5,560,035 A | 9/1996 | Garg et al. |
| 5,561,775 A | 10/1996 | Kurosawa et al. |
| 5,561,776 A | 10/1996 | Popescu et al. |
| 5,564,056 A | 10/1996 | Fetterman et al. |
| 5,564,117 A | 10/1996 | Lentz et al. |
| 5,566,385 A | 10/1996 | Iadonato et al. |
| 5,568,624 A | 10/1996 | Sites et al. |
| 5,574,927 A | 11/1996 | Scantlin |
| 5,574,935 A | 11/1996 | Vidwans et al. |
| 5,574,941 A | 11/1996 | Horst |
| 5,577,200 A | 11/1996 | Abramson et al. |
| 5,577,217 A | 11/1996 | Hoyt et al. |
| 5,584,001 A | 12/1996 | Hoyt et al. |
| 5,586,278 A | 12/1996 | Papworth et al. |
| 5,590,295 A | 12/1996 | Deosaran et al. |
| 5,592,636 A | 1/1997 | Popescu et al. |
| 5,604,865 A | 2/1997 | Lentz et al. |
| 5,604,877 A | 2/1997 | Hoyt et al. |
| 5,604,912 A | 2/1997 | Iadonato et al. |
| 5,606,676 A | 2/1997 | Grochowski et al. |
| 5,608,885 A | 3/1997 | Gupta et al. |
| 5,613,132 A | 3/1997 | Clift et al. |
| 5,615,126 A | 3/1997 | Deeley et al. |
| 5,615,385 A | 3/1997 | Fetterman et al. |
| 5,617,554 A | 4/1997 | Alpert et al. |
| 5,619,664 A | 4/1997 | Glew |
| 5,619,668 A | 4/1997 | Zaidi |
| 5,623,628 A | 4/1997 | Brayton et al. |
| 5,625,788 A | 4/1997 | Boggs et al. |
| 5,625,837 A | 4/1997 | Popescu et al. |
| 5,627,983 A | 5/1997 | Popescu et al. |
| 5,627,984 A | 5/1997 | Gupta et al. |
| 5,627,985 A | 5/1997 | Fetterman et al. |
| 5,628,021 A | 5/1997 | Iadonato et al. |
| 5,630,075 A | 5/1997 | Joshi et al. |
| 5,630,083 A | 5/1997 | Carbine et al. |
| 5,630,149 A | 5/1997 | Bluhm |
| 5,630,157 A | 5/1997 | Dwyer, III |
| 5,640,588 A | 6/1997 | Vegesna et al. |
| 5,651,125 A | 7/1997 | Witt et al. |
| 5,655,098 A | 8/1997 | Witt et al. |
| 5,664,136 A | 9/1997 | Witt et al. |
| 5,666,494 A | 9/1997 | Mote, Jr. |
| 5,682,546 A | 10/1997 | Garg et al. |
| 5,689,672 A | 11/1997 | Witt et al. |
| 5,689,720 A | 11/1997 | Nguyen et al. |
| 5,708,841 A | 1/1998 | Popescu et al. |
| 5,734,584 A | 3/1998 | Iadonato et al. |
| 5,737,624 A | 4/1998 | Garg et al. |
| 5,745,375 A | 4/1998 | Reinhardt et al. |
| 5,754,800 A | 5/1998 | Lentz et al. |
| 5,768,575 A | 6/1998 | McFarland et al. |
| 5,778,210 A | 7/1998 | Henstrom et al. |
| 5,797,025 A | 8/1998 | Popescu et al. |
| 5,802,605 A | 9/1998 | Alpert et al. |
| 5,809,276 A | 9/1998 | Deosaran et al. |
| 5,819,101 A | 10/1998 | Peleg et al. |
| 5,826,055 A | 10/1998 | Wang et al. |
| 5,831,871 A | 11/1998 | Iadonato et al. |
| 5,832,205 A | 11/1998 | Kelly et al. |
| 5,832,292 A | 11/1998 | Nguyen et al. |
| 5,832,293 A | 11/1998 | Popescu et al. |
| 5,838,986 A | 11/1998 | Garg et al. |
| 5,881,275 A | 3/1999 | Peleg et al. |
| 5,892,963 A | 4/1999 | Iadonato et al. |
| 5,896,542 A | 4/1999 | Iadonato et al. |
| 5,941,979 A | 8/1999 | Lentz et al. |
| 5,961,629 A | 10/1999 | Nguyen et al. |
| 5,974,526 A | 10/1999 | Garg et al. |
| 6,038,653 A | 3/2000 | Nguyen et al. |
| 6,038,654 A | 3/2000 | Nguyen et al. |
| 6,044,449 A | 3/2000 | Garg et al. |
| 6,047,348 A | 4/2000 | Lentz et al. |
| 6,083,274 A | 7/2000 | Iadonato et al. |
| 6,092,176 A | 7/2000 | Iadonato et al. |
| 6,092,181 A | 7/2000 | Nguyen et al. |
| 6,101,594 A | 8/2000 | Nguyen et al. |
| 6,128,723 A | 10/2000 | Nguyen et al. |
| 6,131,157 A | 10/2000 | Wang et al. |
| 6,138,231 A | 10/2000 | Deosaran et al. |
| 6,219,763 B1 | 4/2001 | Lentz et al. |
| 6,249,856 B1 | 6/2001 | Garg et al. |
| 6,256,720 B1 | 7/2001 | Nguyen et al. |
| 6,272,579 B1 | 8/2001 | Lentz et al. |
| 6,272,617 B1 | 8/2001 | Deosaran et al. |
| 6,272,619 B1 | 8/2001 | Nguyen et al. |
| 6,282,630 B1 | 8/2001 | Nguyen et al. |
| 6,289,433 B1 | 9/2001 | Garg et al. |
| 6,360,309 B1 | 3/2002 | Iadonato et al. |
| 6,385,634 B1 | 5/2002 | Peleg et al. |
| 6,401,232 B1 | 6/2002 | Iadonato et al. |
| 6,408,375 B2 | 6/2002 | Deosaran et al. |
| 6,412,064 B1 | 6/2002 | Wang et al. |
| 6,418,529 B1 | 7/2002 | Roussel |
| 6,611,908 B2 | 8/2003 | Lentz et al. |
| 6,647,485 B2 | 11/2003 | Nguyen et al. |
| 6,735,685 B1 | 5/2004 | Senter et al. |
| 6,757,808 B2 | 6/2004 | Iadonato et al. |
| 6,775,761 B2 | 8/2004 | Wang et al. |
| 6,782,521 B2 | 8/2004 | Iadonato et al. |
| 6,915,412 B2 | 7/2005 | Nguyen et al. |
| 6,920,548 B2 | 7/2005 | Wang et al. |
| 6,922,772 B2 | 7/2005 | Deosaran et al. |
| 6,934,829 B2 | 8/2005 | Nguyen et al. |
| 6,941,447 B2 | 9/2005 | Nguyen et al. |
| 6,948,052 B2 | 9/2005 | Nguyen et al. |
| 6,954,844 B2 | 10/2005 | Lentz et al. |
| 6,959,375 B2 | 10/2005 | Nguyen et al. |
| 6,970,995 B2 | 11/2005 | Deosaran et al. |
| 6,986,024 B2 | 1/2006 | Nguyen et al. |
| 7,028,161 B2 | 4/2006 | Nguyen et al. |
| 7,043,624 B2 | 5/2006 | Iadonato et al. |
| 7,051,187 B2 | 5/2006 | Garg et al. |
| 7,162,610 B2 | 1/2007 | Nguyen et al. |
| 7,174,525 B2 | 2/2007 | Iadonato et al. |
| 2001/0034823 A1 | 10/2001 | Garg et al. |
| 2002/0059508 A1 | 5/2002 | Lentz et al. |
| 2002/0083300 A1 | 6/2002 | Deosaran et al. |
| 2002/0129324 A1 | 9/2002 | Iadonato et al. |
| 2002/0194456 A1 | 12/2002 | Deosaran et al. |
| 2003/0056086 A1 | 3/2003 | Nguyen et al. |
| 2003/0056087 A1 | 3/2003 | Nguyen et al. |
| 2003/0070060 A1 | 4/2003 | Nguyen et al. |
| 2003/0079113 A1 | 4/2003 | Nguyen et al. |
| 2003/0115440 A1 | 6/2003 | Garg et al. |
| 2004/0024987 A1 | 2/2004 | Lentz et al. |

| | | | |
|---|---|---|---|
| 2004/0054872 A1 | 3/2004 | Nguyen et al. | |
| 2004/0093482 A1 | 5/2004 | Nguyen et al. | |
| 2004/0093483 A1 | 5/2004 | Nguyen et al. | |
| 2004/0093485 A1 | 5/2004 | Nguyen et al. | |
| 2005/0228973 A1 | 10/2005 | Wang et al. | |
| 2006/0020773 A1 | 1/2006 | Deosaran et al. | |
| 2006/0041736 A1 | 2/2006 | Garg et al. | |
| 2006/0064569 A1 | 3/2006 | Lentz et al. | |
| 2006/0123218 A1 | 6/2006 | Iadonato et al. | |
| 2006/0149925 A1 | 7/2006 | Nguyen et al. | |
| 2007/0101103 A1 | 5/2007 | Nguyen et al. | |
| 2007/0106878 A1 | 5/2007 | Nguyen et al. | |
| 2007/0106880 A1 | 5/2007 | Wang et al. | |
| 2007/0113047 A1 | 5/2007 | Garg et al. | |
| 2007/0113214 A1 | 5/2007 | Iadonato et al. | |
| 2008/0059770 A1 | 3/2008 | Garg et al. | |

FOREIGN PATENT DOCUMENTS

| | | |
|---|---|---|
| EP | 0 533 337 | 3/1993 |
| JP | 57-57345 | 4/1982 |
| JP | 60-144830 | 7/1985 |
| JP | 61-40650 | 2/1986 |
| JP | 61-107434 | 5/1986 |
| JP | 62-242243 | 10/1987 |
| JP | 63-192135 | 8/1988 |
| JP | 1-142831 | 6/1989 |
| JP | 1-199233 | 8/1989 |
| JP | 2-048732 | 2/1990 |
| JP | 2-118757 | 5/1990 |
| JP | 2-211534 | 8/1990 |
| JP | 2-224025 | 9/1990 |
| JP | 2-226342 | 9/1990 |
| JP | 3-035324 | 2/1991 |
| JP | 3-218524 | 9/1991 |
| JP | 4-054638 | 2/1992 |
| JP | 4-96132 | 3/1992 |
| JP | 4-503582 | 6/1992 |
| JP | 5-197544 | 8/1993 |
| JP | 6-19707 | 1/1994 |
| WO | WO 91/20031 | 12/1991 |
| WO | WO 88/09035 | 11/1998 |

OTHER PUBLICATIONS

First Amended Complaint, 7 pages, dated Dec. 12, 2006, in *Transmeta Corporation v. Intel Corporation*, in the U.S. District Court for the District of Delaware, Case No. 1:06–cv–00633.

Intel Corporation's Answer, Affirmative Defenses, and Counterclaims to Transmeta's First Amended Complaint, 27 pages, dated Jan. 9, 2007, in *Transmeta Corporation v. Intel Corporation*, in the U.S. District Court for the District of Delaware, Case No. 1:06–cv–00633.

Intel Corporation's Responses to Transmeta's First Set of Interrogatories to Intel Corporation (Nos. 1–24)—Redacted Public Version, 132 pages, dated May 18, 2007, in *Transmeta Corporation v. Intel Corporation*, in the U.S. District for the District of Delaware, Case. No. 1:06–cv–00633.

Intel Corporation's Supplemental Responses to Transmeta Interrogatory Nos. 8, 9, 12, 19, and 21–23—Redacted Public Version, 27 pages, dated Aug. 23, 2007, in *Transmeta Corporation v. Intel Corporation*, in the U.S. District for the District of Delaware, Case No. 1:06–cv–00633.

Intel Corporation's Opening Claim Construction Brief, 76 pages, dated Oct. 19, 2007, in *Transmeta Corporation v. Intel Corporation*, in the U.S. District for the District of Delaware, Case. No. 1:06–cv–00633.

Transmeta Corporation's Opening Claim Construction Brief, 66 pages, dated Oct. 19, 2007, in *Transmeta Corporation v. Intel Corporation*, in the U.S. District for the District of Delaware, Case. No. 1:06–cv–00633.

Stipulation of Dismissal, 1 page, dated Jan. 31, 2008, in *Transmeta Corporation v. Intel Corporation*, in the U.S. District Court for the District of Delaware, Case No. 1:06–cv–00633.

Albert, AJ, "User Configurable Local Storage Registers," *IBM Technical Disclosure Bulletin*, pp. 3971–3975, 1976.

Butler, M. and Patt, Y., "An Improved Area–Efficient Register Alias Table for Implementing HPS," University of Michigan, Ann Arbor, Michigan, 24 pages (Jan. 1990).

Butler, M. et al., "Single Instruction Stream Parallelism Is Greater than Two," Proceedings of the 18th Annual International Symposium on Computer Architecture, ACM, pp. 276–286 (May 1991).

Colwell, R. et al., "Architecture and implementation of a VLIW supercomputer," *Proc. Of the 1990 Conf. on Supercomputing*, 1990.

Colwell, R.P. et al., "A VLIW Architecture for a Trace Scheduling Compiler," Proceedings of the 2nd International Conference on Architectural Support for Programming Languages and Operating Systems, ACM, Oct. 1987, pp. 180–192.

*Convex Architecture Handbook, Version 1*, Convex Computer Corporation, 1984.

Fairchild Semiconductor "Clipper 32–Bit Microprocessor—User's Manual," Prentice–Hall, Inc., 1987.

Hennessy, J.L. and Patterson, D.A., Computer Architecture: A Quantitative Approach, Morgan Kaufmann Publishers, pp. xi–xv, 257–278, 290–314 and 449 (1990).

Huang, J.W. et al., "Dynamically Reconfigurable Vectors," *IBM Technical Disclosure Bulletin*, pp. 3480–3483, Dec. 1980.

Hwu, W. and Patt, Y., "Design Choices for the HPSm Microprocessor Chip," Proceedings of the Twentieth Annual Hawaii International Conference on System Sciences, pp. 330–336 (1987).

Hwu, W. and Patt, Y., "HPSm2: A Refined Single–Chip Microengine," HICSS '88, IEEE, pp. 30–40 (1988).

Hwu, W–M. and Patt, Y.N., "HPSm, a High Performance Restricted Data Flow Architecture Having Minimal Functionality," Proceedings from ISCA–13, IEEE, pp. 297–306 (Jun. 2–5, 1986).

Hwu, W–M. et al., "An HPS Implementation of VAX: Initial Design and Analysis," Proceedings of the Nineteenth Annual Hawaii International Conference on System Sciences, pp. 282–291 (1986).

Intrater et al., "A Superscalar Microprocessor," IEEE Proceedings of the 17th Convention of Electrical & Electronics Engineers In Israel, pp. 267–270 (Mar. 1991).

Margulis, N., "i860 microprocessor internal architecture," Microprocessors and Microsystems, Butterworth & Co. Ltd., vol. 14, No. 2, Mar. 1990, pp. 89–96.

McGeady, "The i960CA SuperScalar Implementation of the 80960 Architecture," IEEE, pp. 232–240 (1990).

Melear, "The Design of the 88000 RISC Family," IEEE Micro, vol. 9, No. 2, pp. 26–38 (Apr. 1989).

Patt, Y.N. et al., "Critical Issues Regarding HPS, A High Performance Microarchitecture", Proceedings of 18th Annual Workshop on Microprogramming, IEEE, pp. 109–116 (Dec. 3–6, 1985).

Patt, Y.N. et al., "Experiments with HPS, a Restricted Data Flow Microarchitecture for High Performance Computers," COMPCON 86, IEEE, pp. 254–258 (1986).

Patt, Y.N. et al., "HPS, A New Microarchitecture: Rationale and Introduction", The 18th Annual Workshop on Microprogramming, Pacific Grove, CA, Dec. 3–6, 1985, IEEE Computer Society Order No. 653, pp. 103–108.

Patt, Y.N. et al., "Run–Time Generation of HPS Microinstructions From a VAX Instruction Stream," Proceedings of Micro 19 Workshop, New York, pp. 75–81 (Oct. 1986).

Peleg, A. and Weiser, U., "Future Trends in Microprocesors: Out–of–Order Execution, Speculative Branching and their CISC Performance Potential", IEEE, pp. 263–266 (1991).

Pleszkun, A.R. and Sohi, G.S., "The Performance Potential of Multiple Functional Unit Processors," Proceedings of the 15th Annual Symposium on Computer Architecture, IEEE, pp. 37–44 (Jun. 1988).

Pleszkun, A.R. et al., "WISQ: A Restartable Architecture Using Queues," Proceedings of the 14th International Symposium on Computer Architecture, ACM, pp. 290–299 (Jun. 1987).

Popescu et al, "The Metaflow Architecture," IEEE Micro, vol. 1 I, No. 3, pp. 10–13, 63–73 (Jun. 1991).

Smith, M.D. et al., "Boosting Beyond Static Scheduling in a Superscalar Processor," ACM SIGARCH Computer Architecture News, ACM Press, vol. 18, Issue 3, Jun. 1990, pp. 344–354.

Smith, J.E. and Pleszkun, A.R., "Implementation of Precise Interrupts in Pipelined Processors," Proceedings of the 12th Annual International Symposium on Computer Architecture, IEEE, pp. 36–44 (Jun. 1985).

Smith, M.D. et al., "Limits on Multiple Instruction Issue," Computer Architecture News, ACM, No. 2, pp. 290–302 (Apr. 3–6, 1989).

Sohi, G.S. and Vajapeyam, G.S., "Instruction Issue Logic For High–Performance, Interruptable Pipelined Processors," Conference Proceedings of the 14th Annual International Symposium on Computer Architecture, pp. 27–34 (Jun. 2–5, 1987).

Swensen, J.A. and Patt, Y.N., "Hierarchical Registers for Scientific Computers," Conference Proceedings: 1988 International Conference on Supercomputing, ICS, Jul. 4–8, 1988, pp. 346–353.

Wilson, J.E. et al., "On Tuning the Microarchitecture of an HPS Implementation of the VAX," Proceedings of the 20th Annual Workshop on Microprogramming, IEEE Computer Society, pp. 162–167 (Dec. 1–4, 1987).

8–Bit Embedded Controller Handbook, Intel, 1989, pp. 1–1–1–19 and 3–1–3–37.

Acosta, R. D. et al., "An Instruction Issuing Approach to Enhancing Performance in Multiple Functional Unit Processors," IEEE Transactions On Computers, IEEE, vol. C–35, No. 9, pp. 815–828 (Sep. 1986).

Agerwala, T. and Cocke, J., "High Performance Reduced Instruction Set Processors," IBM Research Division, pp. 1–61 (Mar. 31, 1987).

Aiken, A. and Nicolau, A., "Perfect Pipelining: A New Loop Parallelization Technique," Proceedings of the 1988 ESOP, Springer Verlag, pp. 221 235 (1988).

Baker, T., "Headroom and Legroom in the 80960 Architecture," COMPCON Spring '90: Thirty–Fifth IEEE Computer Society International Conference, IEEE Computer Society, 1990, pp. 299–306.

Bakoglu et al., "IBM Second–Generation RISC Machine Organization," 1990, IEEE, pp. 173–178.

Butler, M. and Patt, Y., "An Investigation of the Performance of Various Dynamic Scheduling Techniques," Proceedings from Micro 25, pp. 1–9 (Dec. 14, 1992).

Charlesworth, A.E., "An Approach to Scientific Array Processing: The Architectural Design of the AP–120B/FPS–164 Family," Computer, IEEE, vol. 14, pp. 18–27 (Sep. 1981).

Dwyer, H, A Multiple, Out–of–Order Instruction Issuing System for Superscalar Processors, UMI, pp. 1–249 (Aug. 1991).

Findlay, et al., "HARP: A VLIW RISC Processor", Proceeding of 5th Annual European Computer Conference on Advanced Computer Technology, Reliable Systems and Applications, May 16, 1991, pp. 368–372.

Foster, C.C. and Riseman, E.M., "Percolation of Code to Enhance Parallel Dispatching and Execution," IEEE Transactions On Computers, IEEE, pp. 1411–1415 (Dec. 1971).

Gee, J. et al., "The Implementation of Prolog via VAX 8600 Microcode," Proceedings of Micro 19, IEEE, Oct. 1986, pp. 68–74.

Goodman, J.R. and Hsu, W., "Code Scheduling and Register Allocation in Large Basic Blocks," ACM, 1988, pp. 442–452.

Gross, T.R. and Hennessy, J.L., "Optimizing Delayed Branches," Proceedings of the 5th Annual Workshop on Microprogramming, IEEE, pp. 114–120 (Oct. 5–7, 1982).

Groves, R.D. and Oehler, R., "An IBM Second Generation RISC Processor Architecture," Proceedings 1989 IEEE International Conference on Computer Design: VLSI in Computers and Processors, IEEE, Oct. 1989, pp. 134–137.

Hara et al., "Branch Pipeline of DSNS Superscalar Processor Prototype", Computer Architecture, 86–3, Jan. 24, 1991, pp. 1–8 in Japanese language (with English language translation, 20 pages).

Horst, R. W. et al., "Multiple Instruction Issue in the Non-Stop Cyclone Processor," IEEE, 1990, pp. 216–226.

Huang, J.W. et al., "Dynamically Reconfigurable Vectors," IBM Technical Disclosure Bulletin, pp. 3480–3483 (Dec. 1980).

Hunter, C., Series 32000 Programmer's Reference Manual, Prentice–Hall Inc., Englewood Cliffs, NJ, 1987, pp. 2–4, 2–21, 2–23, 6–14 and 6–126.

Hwu, W. and Chang, P.P., "Exploiting Parallel Microprocessor Microarchitectures with a Compiler Code Generator," Proceedings of the 15th Annual Symposium on Computer Architecture, IEEE, pp. 45–53 (Jun. 1988).

Hwu, W. and Patt, Y.N., "Checkpoint Repair for High–Performance Out–of–Order Execution Machines," IEEE Trans. On Computers, IEEE, vol. C–36, No. 12, pp. 1496–1514 (Dec. 1987).

IBM Journal of Research and Development, IBM, vol. 34, No. 1, pp. 1–70 (Jan. 1990).

Jelemensky, "New Microcomputer Features Advanced Hardware For Real–Time Control Applications," Electro Conference Record, vol. 14, Apr. 11, 1989, Los Angeles, CA, pp. 511–519.

Johnson, M. Superscalar Microprocessor Design, Prentice–Hall, pp. vii–xi and 87–125 (1991).

Johnson, M., Superscalar Microprocessor Design, Prentice–Hall, Inc., Dec. 1, 1990.

Johnson, W. M., Super–Scalar Processor Design, (Dissertation), 134 pages (1989).

Jouppi, N.H., "Integration and Packaging Plateaus of Processor Performance," IEEE, 1989, pp. 229–232.

Jouppi, N.P. and Wall, D.W., "Available Instruction–Level Parallelism for Superscalar and Superpipelined Machines," Proceedings of the 3rd International Conference on Architectural Support for Programming Languages and Operating Systems, ACM, pp. 272–282 (Apr. 1989).

Jouppi, N.P., "The Nonuniform Distribution of Instruction–Level and Machine Parallelism and Its Effect on Performance," IEEE Transactions on Computers, vol. 38, No. 12, Dec. 1989, pp. 1645–1658.

Kanai, T. et al., "A 16–bit Microcomputer µPD70423 for Serial Communication," NEC Research & Development, NEC, vol. 32, No. 3, Jul. 1991, pp. 350–360.

Kateveris, Hardware Support "Thesis," p. 138–145 (1984).

Keller, R.M., "Look–Ahead Processors," Computing Surveys, ACM, vol. 7, No. 4, pp. 177–195 (Dec. 1975).

Kogge, P.M., "The Architecture of Pipelined Computers," Static Pipelined Systems Vector Processors, Hemisphere Publishing Corporation, 1981, pp. 167–172.

Lam, M.S., "Instruction Scheduling For SuperScalar Architectures," Annu. Rev. Comput. Sci., vol. 4, 1990, pp. 173–201.

Lightner, B.D. and Hill, G., "The Metaflow Lightning Chipset", Compcon Spring 91, IEEE, pp. 13–18 (Feb. 25–Mar. 1, 1991).

McGeady, S., "The i960A Superscalar Implementation of the 80960 Architecture," IEEE, 1990, pp. 232–240.

Melvin, S. and Patt, Y., "Exploiting Fine Grained Parallelism Through a Combination of Hardware and Software Techniques," The 18th Annual International Symposium on Computer Architecture, ACM SIGARCH, vol. 19, No. 3, pp. 287–296 (May 1991).

Murakami, K. et al., "SIMP (Single Instruction Stream/Multiple Instruction Pipelining): A Novel High–Speed Single–Processor Architecture," ACM, 1989, pp. 78–85.

Nakano, H. et al., "A 80 Mflops 64–bit Microprocessor for Parallel Computer," 1991, IEEE, pp. 15.2.1–15.2.4.

Order Granting Request for Ex Parte Reexamination, mailed Aug. 13, 2007 in Control U.S. Appl. No. 90/008,691, 20 pages.

Order Granting Request for Ex Parte Reexamination, mailed Aug. 29, 2007 in Control U.S. Appl. No. 90/008,712, 16 pages.

Order Granting Request for Ex Parte Reexamination, mailed Jun. 16, 2007 in Control U.S. Appl. No. 90/008,644, 35 pages.

Order Granting Request for Ex Parte Reexamination, mailed May 11, 2007 in Control U.S. Appl. No. 90/008,569, 27 pages.

Order Granting Request for Ex Parte Reexamination, mailed May 11, 2007 in Control U.S. Appl. No. 90/008,573, 17 pages.

Paper No. 28 (Office Action dated Jun. 19, 1996) from U.S. Appl. No. 08/481,146.

Paper No. 32 (Office Action dated Nov. 18, 1996) from U.S. Appl. No. 08/481,146.

Patent Abstracts of Japan, vol. 010, No. 089, Apr. 1986, & JP, A, 60 225 943 (Hitachi Seisakusho K K) Nov. 11, 1985.

Patterson, D. A. and Séquin, C.H., "A VLSI RISC," Computer, IEEE, vol. 15, No. 9, Sep. 1982, pp. 8–18 and 20–21.

Russell, R. M., "The CRAY–1 Computer System," Association for Computing Machinery, Inc., vol. 21, No. 1, Jan. 1978, pp. 63–72.

Thornton, J.E., Design of a Computer: The Control Data 6600, Control Data Corporation, pp. 57–140 (1970).

Tjaden et al., "Representation of Concurrency with Ordering Matrices," IEEE Transactions On Computers, IEEE, vol. C–22, No. 8, pp. 752–761 (August 1973).

Tjaden, G.S. and Flynn, M.J., "Detection and Parallel Execution of Independent Instructions," IEEE Trans. On Computers, IEEE, vol. C–19, No. 10, pp. 889–895 (Oct. 1970).

Tjaden, G.S., Representation and Detection of Concurrency Using Ordering Matrices, (Dissertation), UMI, pp. 1–199 (1972).

Tomasulo, R.M., "An Efficient Algorithm for Exploiting Multiple Arithmetic Units," IBM Journal, IBM, vol. 11, pp. 25–33 (January 1967).

Uht, A.K., "An Efficient Hardware Algorithm to Extract Concurrency From General–Purpose Code," Proceedings of the 19th Annual Hawaii International Conference on System Sciences, HICSS, pp. 41–50 (1986).

Uvieghara, G.A. et al., "An Experimental Single–Chip Data Flow CPU," IEEE Journal of Solid–State Circuits, IEEE, vol. 27, No. 1, pp. 17–28 (January 1992).

Uveighara, G.A. et al., "An Experimental Single–Chip Data Flow CPU," Symposium on ULSI Circuits Design Digest of Technical Papers, 2 pages (May 1990).

Vin et al., "Instruction Scheduling in High–Performance Architectures—MIDR Algorithm," CIPS Edmonton '88, Chaos Into Order, Proceedings, Edmonton, Alta., Canada, pp. 69–75 (Nov. 7, 1988).

Wedig, R.G., Detection of Concurrency In Directly Executed Language Instruction Streams, (Dissertation), UMI, pp. 1–179 (June 1982).

Weiss, R., "Third–Generation RISC Processors", On Special Report, Mar. 30, 1992, pp. 96–108.

Weiss, S. and Smith, J.E., "Instruction Issue Logic in Pipelined Supercomputers," IEEE Trans. on Computers, IEEE, vol. C–33, No. 11, pp. 77–86 (November 1984).

English Language Abstract for JP Patent Publication No. 1–142831.

English Language Abstract for JP Patent Publication No. 1–199233.

English Language Abstract for JP Patent Publication No. 2–048732.

English Language Abstract for JP Patent Publication No. 2–118757.

English Language Abstract for JP Patent Publication No. 2–211534.

English Language Abstract for JP Patent Publication No. 2–224025.

English Language Abstract for JP Patent Publication No. 2–226342.

English Language Abstract for JP Patent Publication No. 3–035324.

English Language Abstract for JP Patent Publication No. 3–218524.

English Language Abstract for JP Patent Publication No. 4–054638.

English Language Abstract for JP Patent Publication No. 4–096132.

English Language Abstract for JP Patent Publication No. 4–503582.

English Language Abstract for JP Patent Publication No. 5-197544.

English Language Abstract for JP Patent Publication No. 6-019707.

English Language Abstract for JP Patent Publication No. 57-057345.

English Language Abstract for JP Patent Publication No. 60-144830.

English Language Abstract for JP Patent Publication No. 61-040650.

English Language Abstract for JP Patent Publication No. 61-107434.

English Language Abstract for JP Patent Publication No. 62-242243.

English Language Abstract for JP Patent Publication No. 63-192135.

G. Myers et al., *The 80960 Microprocessor Architecture* (John Wiley & Sons, Inc., 1988) ("the 80960 Book").

*Third –Generation TMS320 User's Guide* (Texas Instruments, 1988) ("the TMS320 User's Guide").

W. Maly et al., *Memory Chip for 24 –Port Global Register File,* Custom Integrated Circuits Conference, Proceedings of the IEEE, published May 12, 1991 ("Maly").

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–5 is confirmed.

* * * * *